United States Patent
Bergami et al.

(10) Patent No.: US 7,607,909 B2
(45) Date of Patent: Oct. 27, 2009

(54) COMPRESSION MOULDING APPARATUS, METHODS AND ITEM

(75) Inventors: Stefano Bergami, Castel San Pietro Terme (IT); Paolo Martelli, Lugo (IT); Fabrizio Pucci, Castel Guelfo (IT)

(73) Assignee: Sacmi Cooperativa Meccanici Imola Societa' Cooperativa, Imola (BO) (IT)

( * ) Notice: Subject to any disclaimer, the term of this patent is extended or adjusted under 35 U.S.C. 154(b) by 403 days.

(21) Appl. No.: 10/576,870

(22) PCT Filed: Oct. 22, 2004

(86) PCT No.: PCT/EP2004/011968

§ 371 (c)(1),
(2), (4) Date: Apr. 21, 2006

(87) PCT Pub. No.: WO2005/039853

PCT Pub. Date: May 6, 2005

(65) Prior Publication Data
US 2007/0071981 A1 Mar. 29, 2007

(30) Foreign Application Priority Data
Oct. 23, 2003 (IT) .................. MO2003A0289

(51) Int. Cl.
*B29C 31/06* (2006.01)
(52) U.S. Cl. .............. 425/186; 425/219; 425/345; 425/349; 425/422

(58) Field of Classification Search ........... 425/182, 425/186, 219, 809, 344–345, 349, 422, 438, 425/453
See application file for complete search history.

(56) References Cited

U.S. PATENT DOCUMENTS

| 3,135,019 | A | 6/1964 | Aichele |
| 4,873,045 | A | 10/1989 | Fujita et al. |
| 4,913,871 | A | 4/1990 | Kawaguchi et al. |
| 4,943,405 | A | 7/1990 | Keller et al. |
| 5,807,592 | A | 9/1998 | Alieri et al. |
| 7,025,582 | B2 * | 4/2006 | Battilani .............. 425/186 |
| 2003/0116879 | A1 | 6/2003 | Mueller et al. |

(Continued)

FOREIGN PATENT DOCUMENTS

EP        1 243 393 A    9/2002

(Continued)

OTHER PUBLICATIONS

International Search Report for PCT/EP04/11968 Oct. 27, 2005.

(Continued)

*Primary Examiner*—Yogendra Gupta
*Assistant Examiner*—Thu Khanh T Nguyen
(74) *Attorney, Agent, or Firm*—Nixon & Vanderhye P.C.

(57) ABSTRACT

An apparatus comprises a moulding unit having a punch and a mould cavity movable along a path between an open position in which said punch and said mould cavity are distanced apart from each other to receive a dose of plastics therebetween, and a closed position in which said punch and said mould cavity interact to form an item by pressing said dose, said punch being kept not above said cavity along said path.

55 Claims, 20 Drawing Sheets

U.S. PATENT DOCUMENTS

| | | |
|---|---|---|
| 2005/0067735 A1 | 3/2005 | Kaufman |
| 2007/0071981 A1 | 3/2007 | Bergami et al. |

FOREIGN PATENT DOCUMENTS

| | | |
|---|---|---|
| EP | 1 293 332 | 3/2003 |
| FR | 2 775 959 | 9/1999 |
| GB | 874 084 | 8/1961 |
| WO | 01/68468 | 9/2001 |
| WO | 02/057063 | 7/2002 |
| WO | 03/090989 | 11/2003 |
| WO | 03/090990 | 11/2003 |

OTHER PUBLICATIONS

Patent Abstract of Japan, vol. 1997, No. 12, Dec. 25, 1997 and JP 09 216315, Aug. 19, 1997.

* cited by examiner

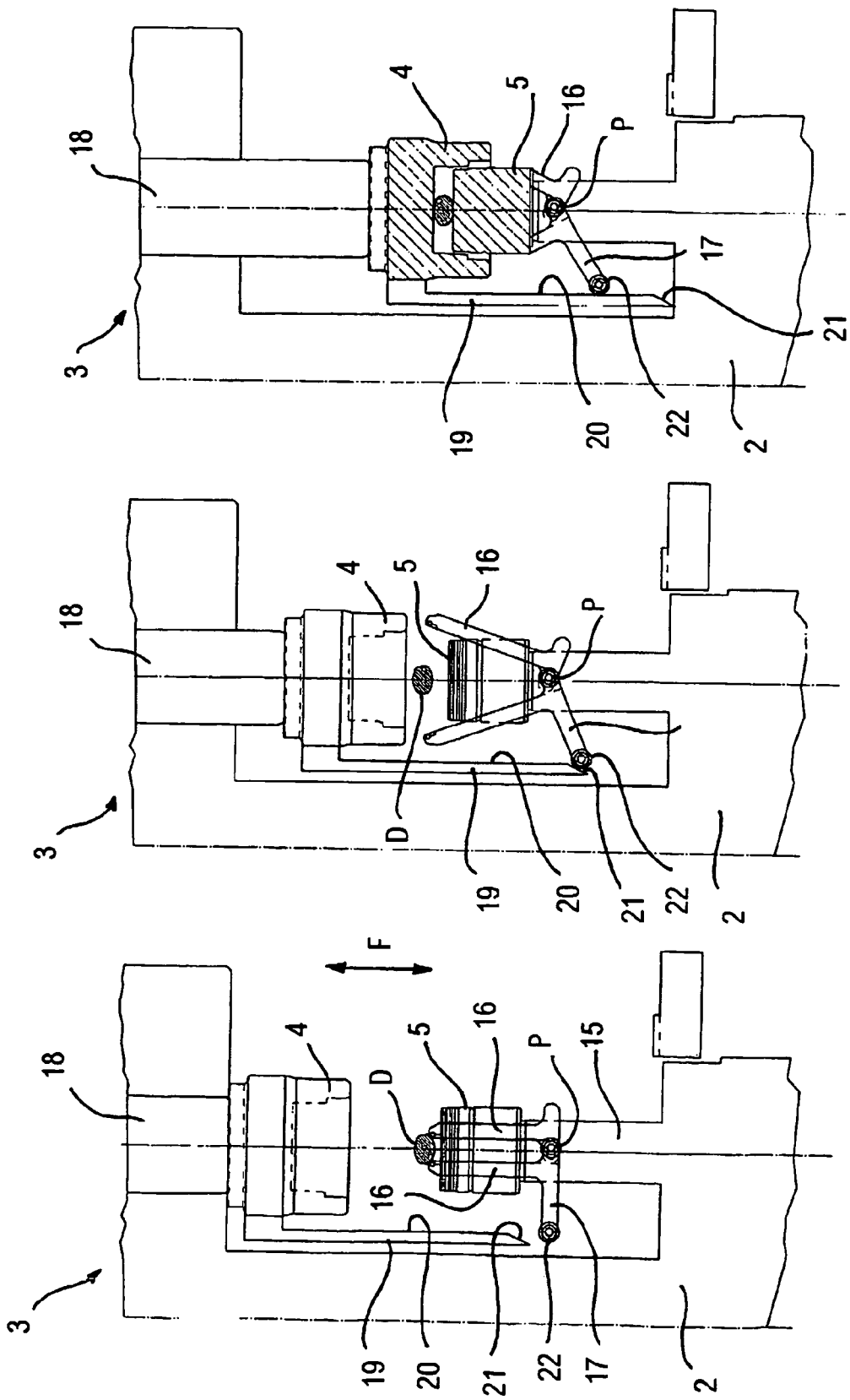

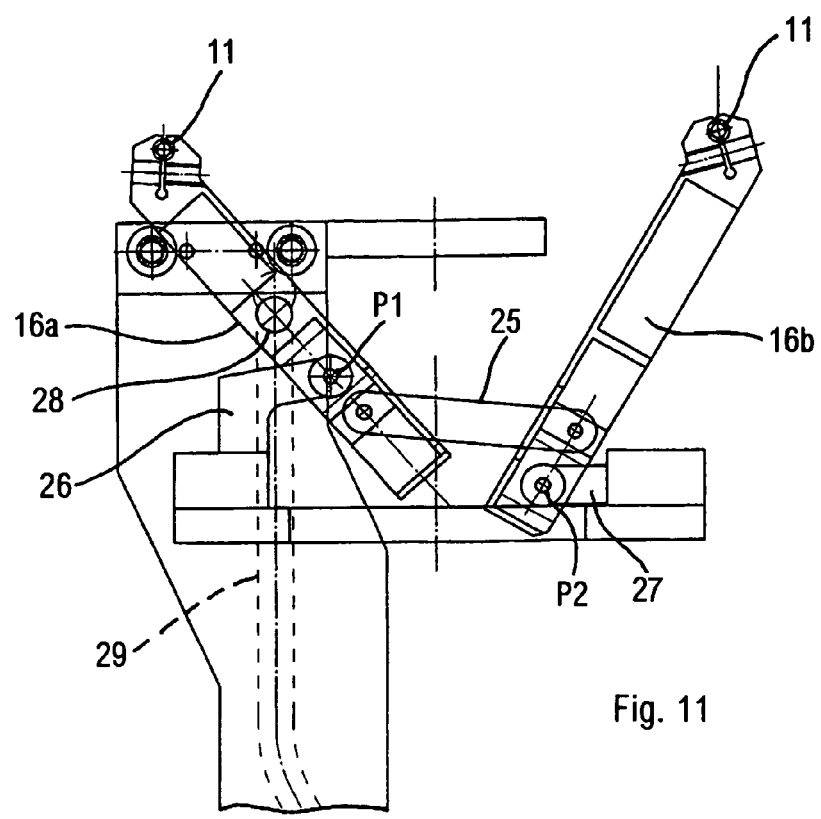
Fig. 11
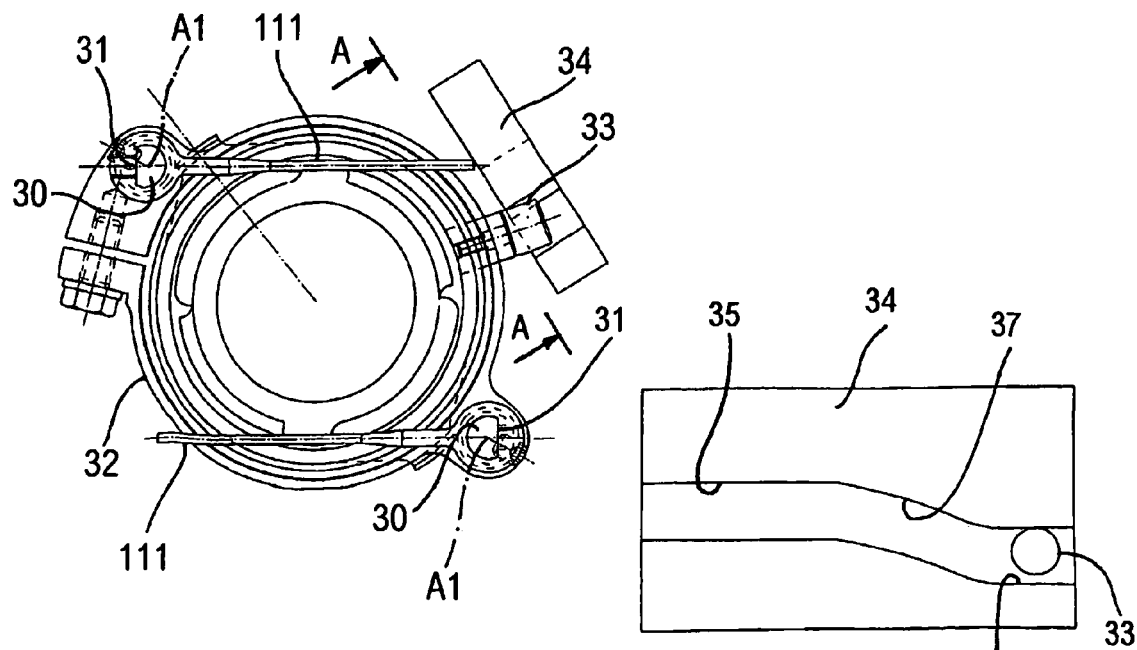
Fig. 12
Fig. 13

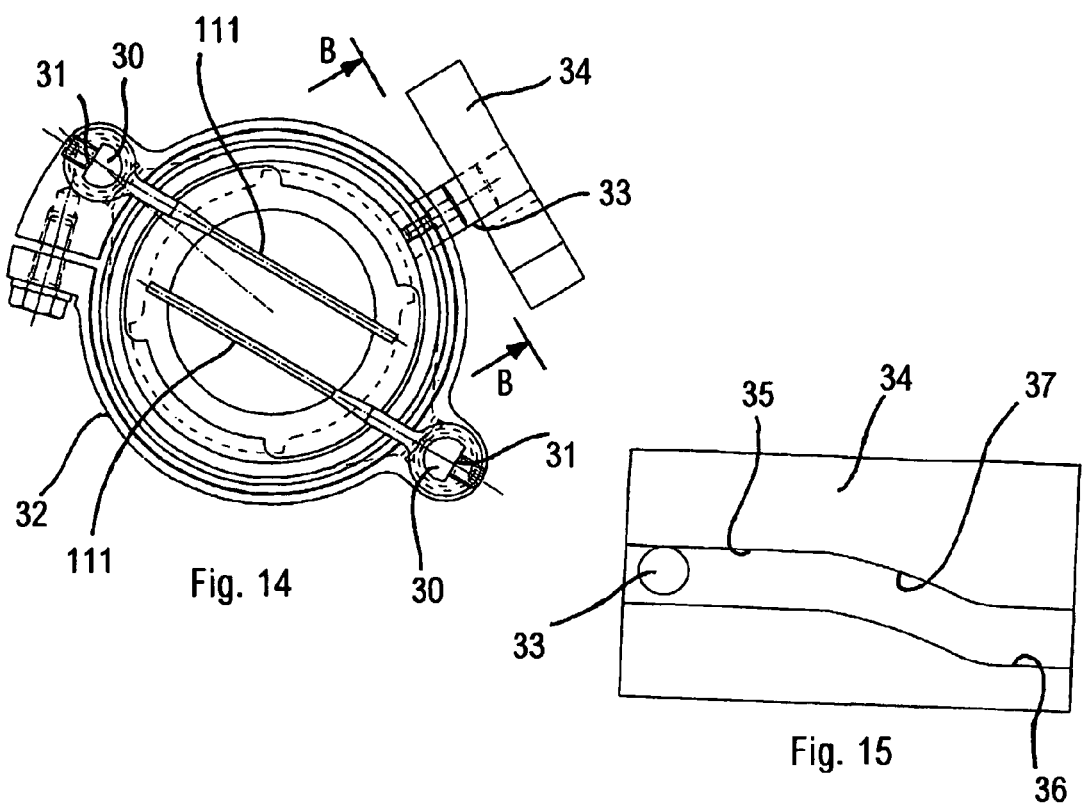
Fig. 14
Fig. 15
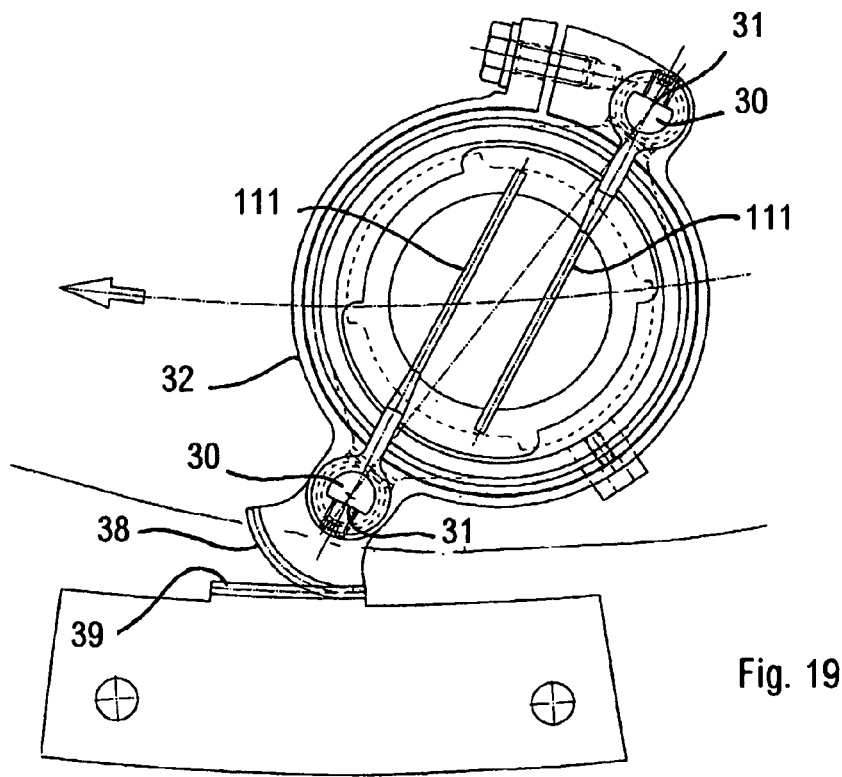
Fig. 19

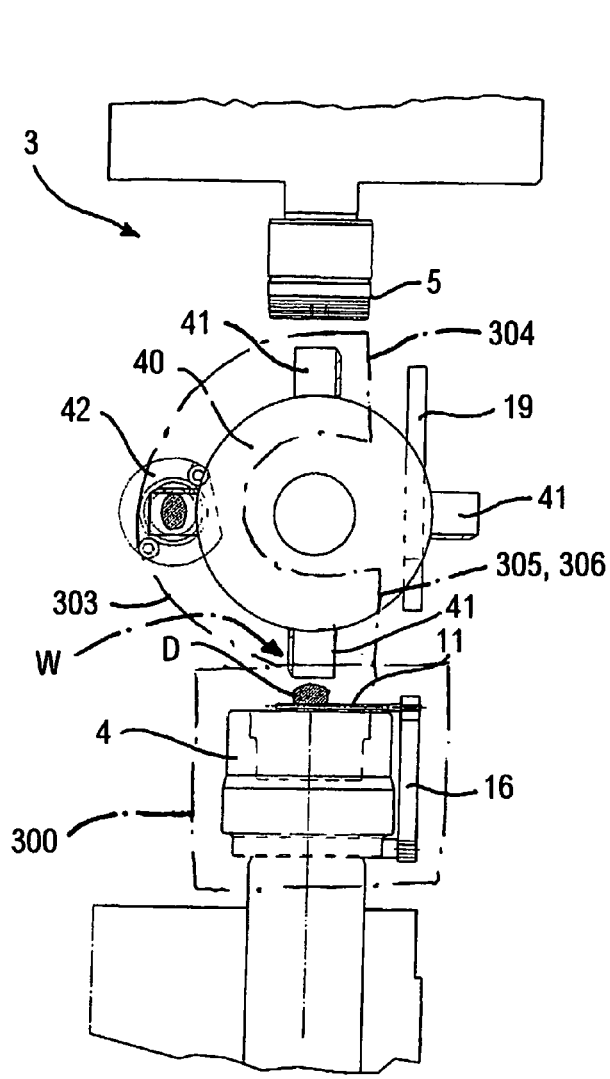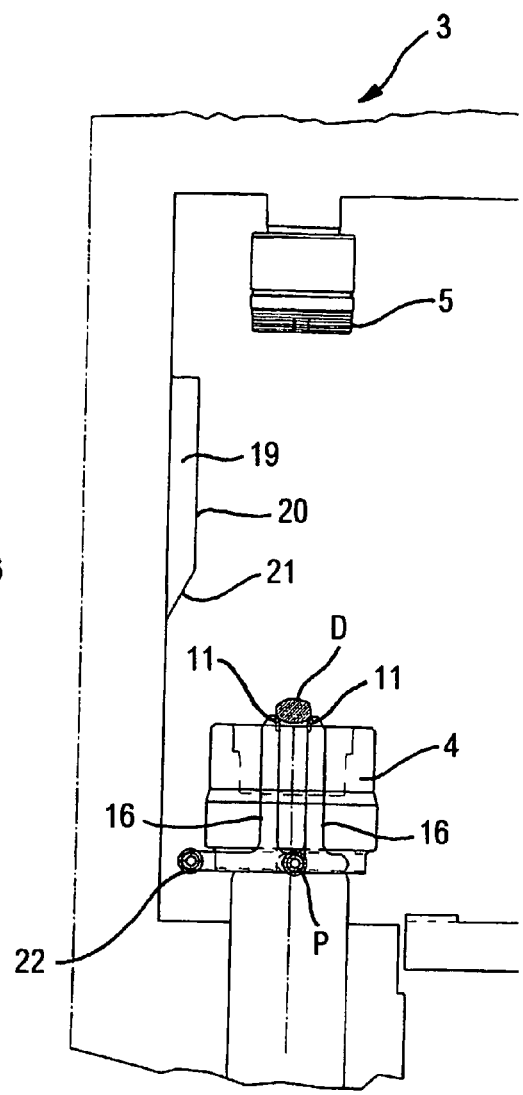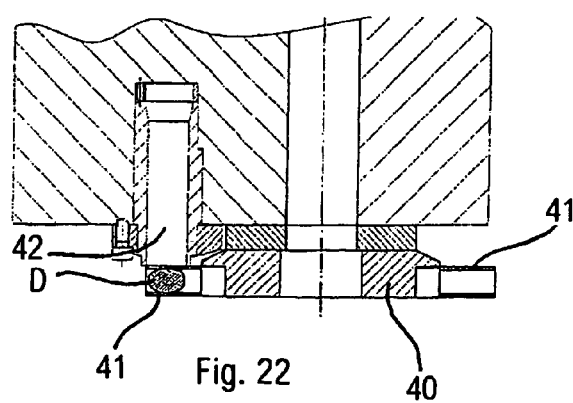
Fig. 20         Fig. 21
Fig. 22

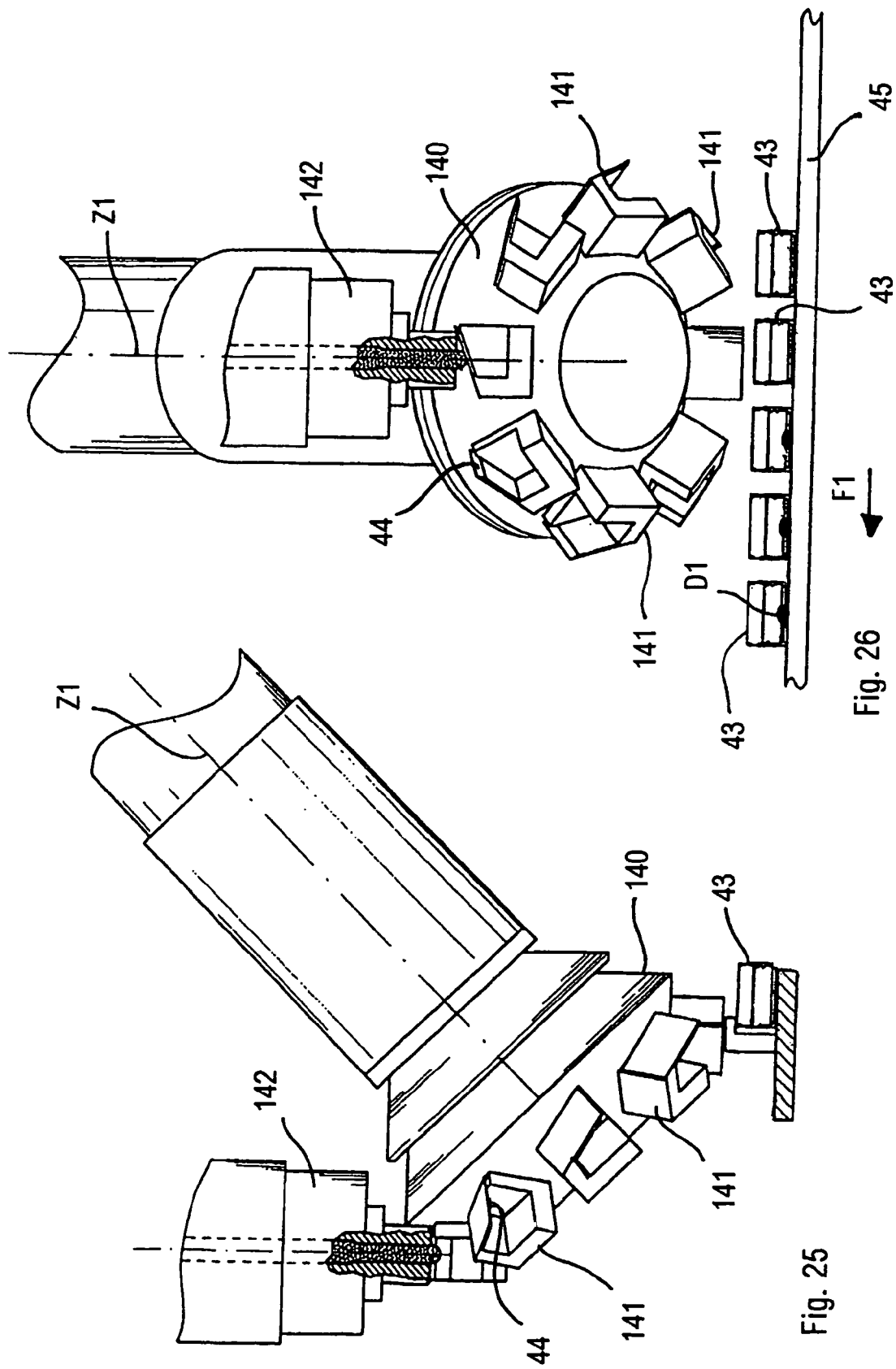

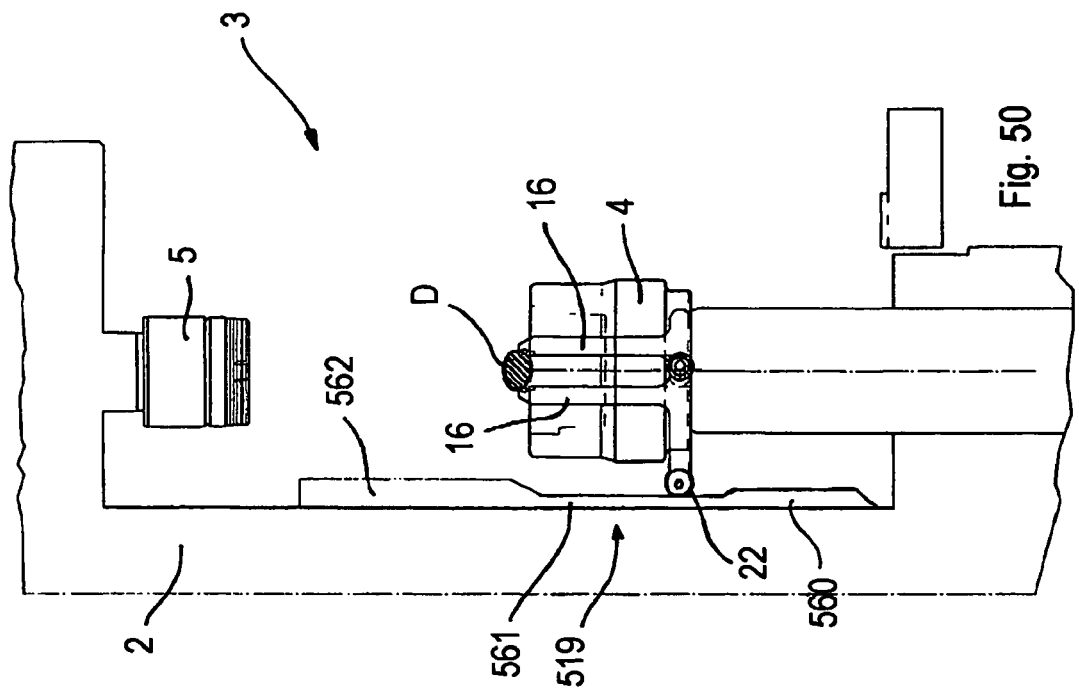
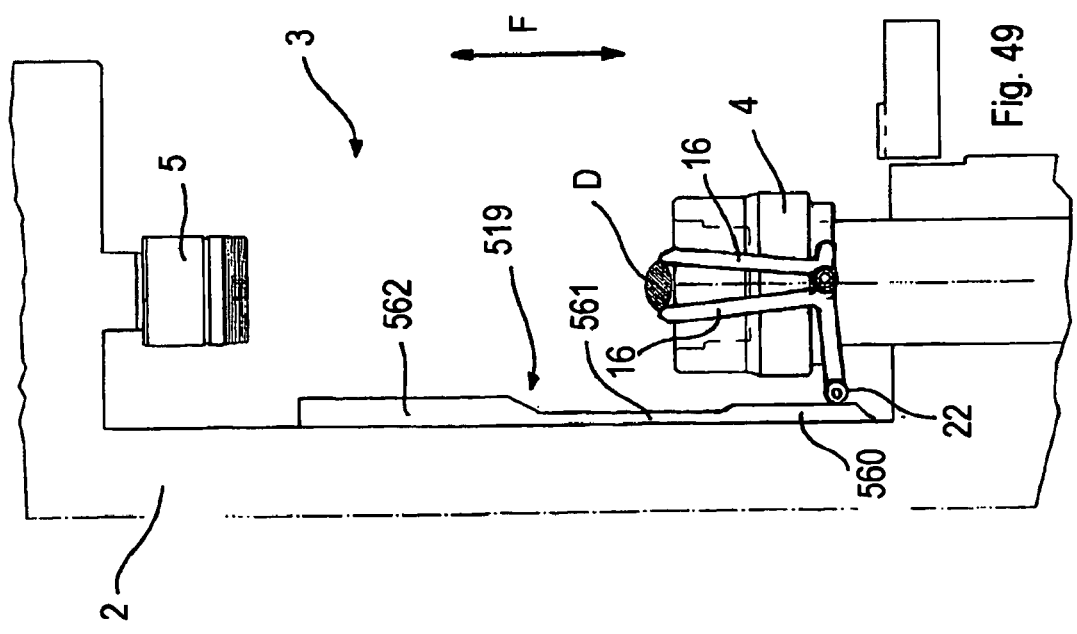

COMPRESSION MOULDING APPARATUS, METHODS AND ITEM

This application is the US national phase of international application PCT/EP2004/011968 filed 22 Oct. 2004, which designated the U.S. and claims benefit of IT MO2003A000289 filed 23 Oct. 2003, the entire contents of each of which are hereby incorporated by reference.

The invention relates to apparatuses and methods for producing items, for example for compression moulding items made of plastics, such as caps for bottles and containers. The invention further relates to an item made of plastic materials.

U.S. Pat. No. 5,807,592 discloses an apparatus for producing caps having a plurality of moulding units mounted on a carousel which rotates around an axis. Each moulding unit includes a mould cavity in which a dose of plastic material in a fluid or semifluid state is fed and a punch which interacts with the cavity so as to shape the dose according to the desired shape of the cap. Each mould cavity and the corresponding punch are movable between an open position in which they are distanced apart to receive the dose therebetween and a closed position in which they interact to form the cap from the dose by compression moulding.

Plastics is fed by an extruder and removed therefrom by means of removal elements fixed to the edge of a pan rotatable around a further axis parallel to the axis of the carousel. Each removal element removes from the extruder a dose of plastics, which due to its viscosity remains attached to the corresponding removal element.

The removal element carrying the dose rotates together with the pan and reaches a position above an underlying cavity, which is distanced apart from the corresponding punch. An air blast detaches from the removal element the dose, which falls in the underlying cavity where it will be formed.

A defect of the apparatus disclosed in U.S. Pat. No. 5,807, 592 is that the lower portion of the dose which contacts the cavity when falling thereon is cooled more quickly than the adjacent portions of the dose. Therefore, the viscosity of the plastic dose in its lower portion increases more than in the adjacent portions of the dose, which prevents the material of the dose from flowing freely inside the moulding unit and uniformly filling the space between the cavity and the punch.

Furthermore, due to non-uniform cooling of the dose, a cap is obtained in which the zones that cooled earlier have an appearance and a structure different from the zones that cooled later. Since the zones which cool first are located on the outer surface of the cap which is in contact with the cavity, such zones are unpleasantly visible by a consumer when the cap is in use.

U.S. Pat. No. 4,943,405 discloses an apparatus for manufacturing compression moulded articles having an annular cross-section, in which a mould cavity is arranged beneath an extruder. On opening of a closing element of the extruder, a stream of heated thermoplastic material with an annular cross-section flows from the orifice of the die and is supported by an intermediate support. The intermediate support extends inside of the mould cavity and is movable therein between an extended position, in which the intermediate support is close to the extruder to receive the thermoplastic material therefrom, and a retracted position in which the intermediate support retracts below the mould cavity so as to define a bottom part thereof and the thermoplastic material is formed according to a desired shape.

A defect of the apparatus disclosed in U.S. Pat. No. 4,943, 405 is that a complicated structure is disclosed, which requires that the intermediate support be associated to an actuating device capable of functioning into the narrow region of the cavity.

Furthermore, due to mechanical wear of the intermediate support and/or the cavity, the heated thermoplastic material may penetrate in the space between the side walls of the mould cavity and the intermediate support which defines the bottom part of the cavity. If this happens, a defective line is formed on the finished article, the defective line protruding from the body of the article.

An object of the invention is to improve the apparatuses and methods for producing items, especially for compression moulding plastics items.

A further object of the invention is to provide apparatuses and methods by means of which plastics items having a good appearance and relatively uniform mechanical, physical and chemical properties may be obtained.

A still further object of the invention is to provide apparatuses having a moulding unit in which a plastics item is produced, the moulding unit being of simplified construction.

According to a first aspect of the invention, there is provided an apparatus, comprising a moulding unit having a punch and a mould cavity movable along a path between an open position in which said punch and said mould cavity are distanced apart from each other to receive a dose of plastics therebetween, and a closed position in which said punch and said mould cavity interact to form an item by pressing said dose, said punch being kept not above said cavity along said path.

In one embodiment, there is provided a supporting arrangement extending externally of said mould cavity for supporting said dose between said punch and said mould cavity in said open position.

This allows the dose of plastics to be kept between the punch and the mould cavity in the open position irrespective of the position of the punch relative to the mould cavity.

In particular, the punch may be placed under the cavity, or the punch and the cavity may be placed on a common horizontal plane, while the dose is kept therebetween.

According to a second aspect of the invention, there is provided an apparatus, comprising a moulding unit having a punch and a mould cavity movable between an open position in which said punch and said mould cavity are distanced apart from each other to receive a dose of plastics therebetween, and a closed position in which said punch and said mould cavity interact to form an item by pressing said dose, a supporting arrangement extending externally of said mould cavity for supporting said dose between said punch and said mould cavity in said open position and oscillatable by a movable cam arrangement.

Owing to this aspect of the invention, it is possible to keep the plastics dose out of contact with the cavity walls until immediately before the punch enters the cavity.

Thus, undesirably precocious cooling of dose portions is avoided and each dose maintains a substantially uniform density throughout its volume.

According to a third aspect of the invention, there is provided an apparatus, comprising a pair of rods for supporting a dose of plastics between a punch and a mould cavity, said pair of rods being connected to a respective pair of levers hinged at a base body, each lever of said pair of levers being connected to the other lever of said pair of levers by a connection rod.

According to a fourth aspect of the invention, there is provided an apparatus, comprising a moulding unit having a punch and a mould cavity movable along an axis between an open position in which said punch and said mould cavity are distanced apart from each other to receive a dose of plastics therebetween, and a closed position in which said punch and said mould cavity interact to form an item by pressing said dose, a supporting arrangement for supporting said dose between said punch and said mould cavity and having a member oscillatable paralely to said axis.

According to a fifth aspect of the invention, there is provided an apparatus, comprising a moulding unit having a punch and a mould cavity movable between an open position in which said punch and said mould cavity are distanced apart from each other to receive a dose of plastics therebetween, and a closed position in which said punch and said mould cavity interact to form an item by pressing said dose, a supporting arrangement for supporting said dose between said punch and said mould cavity and oscillatable by a gear device.

Owing to these aspects of the invention, support for the dose of plastics may be provided in a particularly simple manner.

According to a sixth aspect of the invention, there is provided an apparatus, comprising a moulding unit having a punch and a mould cavity movable along an axis between an open position in which said punch and said mould cavity are distanced apart from each other to receive a dose of plastics therebetween, and a closed position in which said punch and said mould cavity interact to form an item by pressing said dose, a supporting arrangement for supporting said dose between said punch and said mould cavity, said supporting arrangement comprising a supporting member of porous material.

According to a seventh aspect of the invention, there is provided an apparatus, comprising a moulding unit having a punch and a mould cavity movable along an axis between an open position in which said punch and said mould cavity are distanced apart from each other to receive a dose of plastics therebetween, and a closed position in which said punch and said mould cavity interact to form an item by pressing said dose, a supporting arrangement for supporting said dose between said punch and said mould cavity, said supporting arrangement comprising a tubular supporting member having holes through which air can be injected toward said dose.

Owing to this aspect of the invention, it is possible to insufflate a fluid, for example air, at a predetermined state (i.e. temperature and/or pressure and/or humidity) so that the dose can be maintained at a desired state.

According to an eighth aspect of the invention, there is provided an apparatus, comprising a moulding unit having a punch and a mould cavity movable along an axis between an open position in which said punch and said mould cavity are distanced apart from each other to receive a dose of plastics therebetween, and a closed position in which said punch and said mould cavity interact to form an item by pressing said dose, a supporting arrangement for supporting said dose between said punch and said mould cavity, said supporting arrangement comprising a supporting member of thermally substantially non-conductive material.

Owing to this aspect, cooling of the dose is substantially avoided when contact occurs between the dose and the supporting member.

According to a ninth aspect of the invention, there is provided an apparatus, comprising a moulding unit having a punch and a mould cavity movable between an open position in which said punch and said mould cavity are distanced apart from each other to receive a dose of plastics therebetween, and a closed position in which said punch and said mould cavity interact to form an item by pressing said dose, a dose-delivering mouth of an extruder being interposed between said punch and said moulding cavity in said open position.

Owing to this aspect of the invention, it is no longer necessary to provide a rotatable pan, or another transport arrangement, to transfer the dose of plastics from the extruder to the mould cavity. Construction of the machine is therefore significantly simplified.

In one embodiment, a severing arrangement co-operates with the dose-delivering mouth so as to sever the dose from the extruder.

The severing arrangement can be mounted on the moulding unit.

The severing arrangement can be rotatable around a respective axis.

The severing arrangement may be driven by an independent motor unit.

The severing arrangement may be provided with a blade connected to a supporting member of a supporting arrangement, or with a knife mounted on the punch or the moulding cavity.

Owing to the severing arrangement, the dose may easily be detached from the extruder mouth and delivered to the moulding unit.

According to a tenth aspect of the invention, there is provided an apparatus, comprising a moulding unit having a punch and a mould cavity movable between an open position in which said punch and said mould cavity are distanced apart from each other and receive a plurality of doses of plastics therebetween, and a closed position in which said punch and said mould cavity interact to form an item by pressing said plurality of doses.

Owing to this aspect of the invention, it is possible to manufacture items of plastics made from two or more materials, or colours of the same or different materials.

According to an eleventh aspect of the invention, there is provided a mould compression item comprising a body formed from a plurality of plastic materials having different properties and/or appearance from one another.

Thus, a mould compression item is obtained which is more attractive than conventional mould compression items due to the combination of two or more colours of the same material for the various doses.

It is also possible to provide a mould compression item having peculiar properties due to the combination or juxtaposition of various materials.

According to a twelfth aspect of the invention, there is provided a method, comprising delivering a plurality of doses of plastics to a moulding unit and pressing together said plurality of doses between a punch and a mould cavity.

This allows the new mould compression item to be easily manufactured.

According to a thirteenth aspect of the invention, there is provided an apparatus comprising a moulding unit having a punch and a mould cavity one of which serving as a receiving member for receiving a dose of plastics in an open position, said moulding unit being movable along a path between said open position and a closed position in which said punch and said mould cavity interact to form an item by pressing said dose a channel system being provided to surround said receiving member in said open position along said path.

In one embodiment a transferring device is provided for transferring said dose from an extruder mouth to said moulding unit along a further path, said transferring device being surrounded by a channel system extending along said further path.

Owing to this aspect of the invention, it is possible to introduce a conditioning fluid into said channel system so as to keep said dose in a desired environment.

Thus, for example, temperature of the dose can be easily controlled.

In a fourteenth aspect of the invention, there is provided a method for compression moulding of plastics items, comprising forming a dose of plastics in a moulding unit by bringing together a punch and a mould cavity, wherein before said bringing together, said dose is propelled towards either said punch, or said mould cavity.

This allows to minimize the period of time in which the dose is kept in contact with the mould parts before the parts are brought together and form the item.

In a fifteenth aspect of the invention, there is provided an apparatus, comprising a pair of rods for supporting a dose of plastics between a punch and a mould cavity, said pair of rods being actuatable by a cam arrangement having a first portion for driving said rods in a dose-receiving position in which said dose is received above said rods and a second portion for driving said rods in a dose-pinching position in which said dose is pinched between said rods, said second portion being adjacent to said first portion.

In a sixteenth aspect of the invention, there is provided a method for compression moulding of plastics items, comprising forming a dose of plastics in a moulding unit by bringing together a punch and a mould cavity, and further comprising, before said bringing together, resting said dose on a pair of rods, moving said rods close to one another so as to pinch said dose, and delivering said dose from said rods to said moulding unit, wherein between said resting and said moving the dose remains in contact with said rods.

Owing to the fifteenth and sixteenth aspects of the invention, the rods can firmly hold the dose before delivering it to the moulding unit. The dose, pinched by the rods, is prevented from reaching the moulding unit at an undesired time even if subjected to high accelerations.

In order that the invention may be clearly and completely disclosed, reference will now be made, by way of example, to the accompanying drawings, in which:

FIGS. 2 to 4 are fragmentary views of a moulding unit of the apparatus of FIG. 1, in subsequent moulding steps;

FIG. 11 is a schematic, fragmentary side view of a supporting arrangement for supporting a dose of plastics material between a moulding cavity and a punch of the apparatus of FIG. 1;

FIG. 12 is a fragmentary, plan view of supporting members for supporting a dose of plastics material, in a dose-delivering configuration;

FIG. 13 is a front view of a cam actuating the supporting members of FIG. 12, taken along the plane A-A of FIG. 12;

FIG. 14 is a view like FIG. 12, showing the supporting members in a dose-receiving configuration;

FIG. 15 is a view like FIG. 13, taken along the plane B-B of FIG. 14;

FIG. 19 is a plan view of supporting members actuated by a gear device;

FIG. 20 is a fragmentary, front view of a moulding unit provided with a transferring device for transferring a plastics dose from an extruder mouth to a supporting arrangement;

FIG. 21 is a side view of the moulding unit of FIG. 20, in which the transferring device has been removed for ease of understanding;

FIG. 22 is a view from above of the transferring device shown in FIG. 20;

FIG. 25 is a view like FIG. 24, showing a transferring device used to transfer doses of plastics material from an extruder mouth to already formed caps, in order to form a sealing member thereon;

FIG. 26 is a front view of the transferring device of FIG. 25;

FIGS. 49 and 50 are fragmentary, partially sectioned side views of a moulding unit in which a dose is pinched by a pair of supporting rods.

Within the context of the present description the expression "mould cavity" has to be construed as meaning a cavity either of a mould in a moulding unit, or of a formed item in which a dose of plastics has to be inserted and subsequently compression moulded, for example when it is desired to form a seal for a screw cap.

Figure 1:
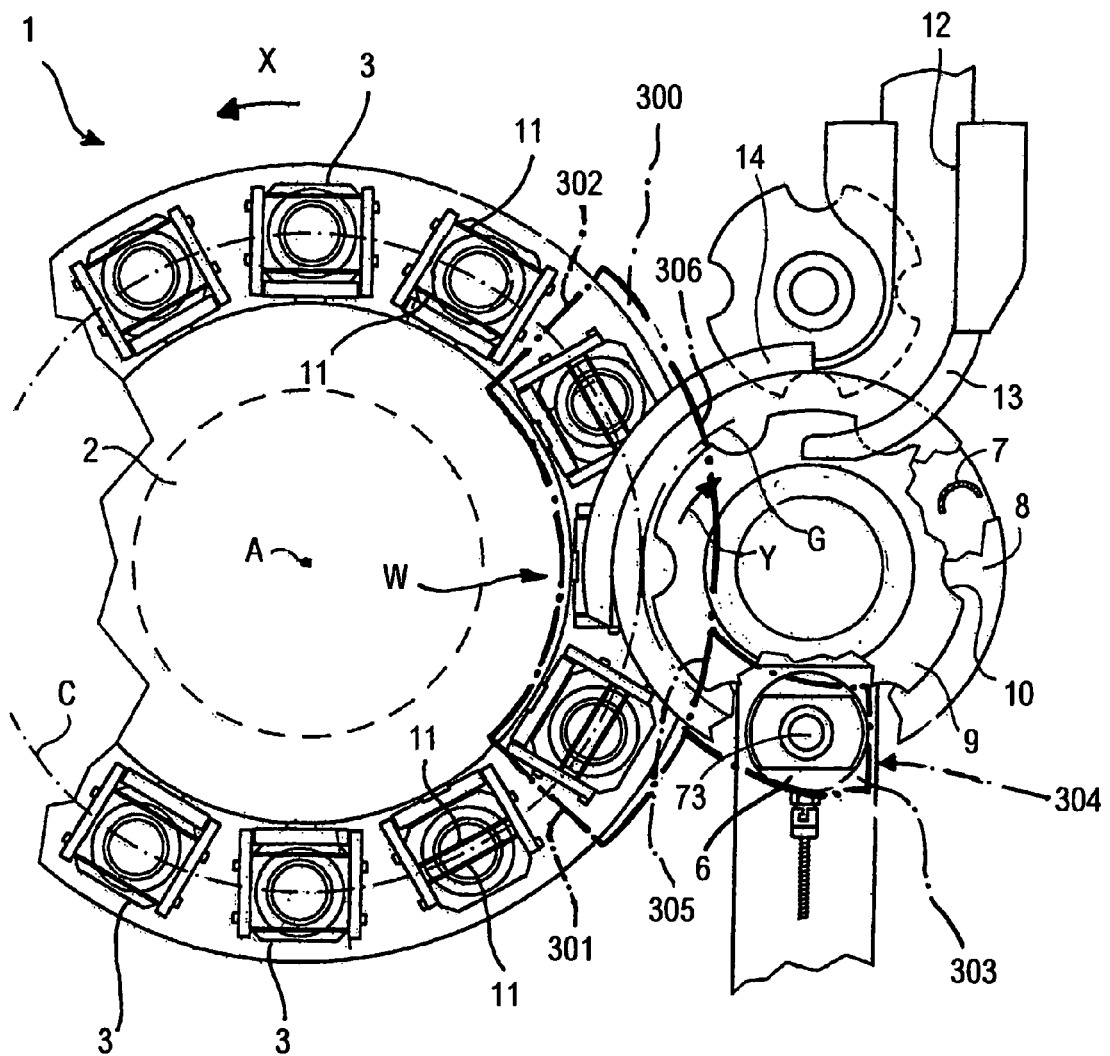
FIG. 1 is a plan view of an apparatus for compression moulding of plastics caps.

FIG. 1 shows an apparatus 1 for compression moulding plastics items, particularly plastics caps for bottles or containers. The apparatus 1 includes a carousel 2 rotatable in the direction of the arrow X around an axis A and provided, in a peripheral region thereof, with a plurality of moulding units 3. Each moulding unit 3 includes a mould cavity shaped according to the external geometry of the cap to be obtained and a punch reproducing the internal shape of the cap.

The mould cavity and the punch are movable between an open position in which they are distanced apart from each other to receive a dose of plastics therebetween, and a closed position in which the punch and the mould cavity interact to form the cap from the dose.

The dose is fed by an extruder 6 in a fluid or semifluid state and removed from the extruder 6 by removal elements 7. The removal elements 7 are fixed to the lower part of a circular plate 8 rotatable in the direction of the arrow Y around a further axis parallel to the axis A. A star-disc 9 is movable rigidly with the plate 8 and is located above the plate 8. The star-disc 9 is peripherally provided with a plurality of recesses 10 used to remove each cap from the corresponding moulding unit.

Each removal element 7, when passing above the extruder 6, removes from the mouth of the extruder the dose, which remains adherent to the removal element 7 due to the viscosity of the plastics. As the plate 8 rotates, the removal element 7 carries the dose along a circular path G until the removal element 7 reaches a position in which it interacts with a moulding unit 3. The latter is in the open position, so as to be capable of receiving the dose from the corresponding removal element 7.

The dose is detached from the removal element 7 by an air blast and falls onto an underlying supporting arrangement having a pair of rods 11 arranged between the mould cavity and the punch. Simultaneously, the cap formed in the moulding unit 3 during a previous working cycle is removed therefrom by a respective recess 10 of the star-disc 9 and conveyed towards an exit channel 12 along a path defined by guides 13, 14.

The structure of the star-disc 9 and of the rotatable plate 8 is disclosed in detail in U.S. Pat. No. 5,807,592, which is herewith incorporated by reference.

The rods 11 are movable between a dose-receiving configuration in which the rods 11 are relatively close to each other to retain the dose falling from the removal element 7, and a dose-delivering configuration in which the rods 11 are relatively distanced apart from each other to deliver the dose to the moulding unit 3.

In a further embodiment, which is not shown, an air blast is provided for detaching the dose D from the removal element 7. The rods 11, actuated by a respective cam, grip the dose D attached to the removal element 7 and remove therefrom the dose D.

After the dose has been delivered to the moulding unit 3, the punch and the mould cavity reach the closed position so as to form the cap from the dose and stabilise its shape along the circular path C of the carousel 2. Thereafter, the mould cavity and the punch open to allow the cap to be removed and a new working cycle begins.

A first channel segment 300 having a curved profile surrounds a portion of the carousel 2; the first channel segment 300 is stationary and has a first inlet 301 through which the mould cavities 4 enter one after the other and a first outlet 302 from which the mould cavities 4 exit the first channel segment 300. At a delivering position W between the first inlet 301 and the first outlet 302 the dose D is delivered by the rotatable plate 8 to the rods 11.

A second channel segment 303 extends from a nozzle 73 of the extruder 6 to the delivering position W around the rotatable plate 8. The second channel segment 303 has a second inlet 304 through which the removal elements 7 enter the second channel segment 303 one after the other and a second outlet 305 from which the removal elements correspondingly exit the second channel segment 303.

The first channel segment 300 is provided with a third exit 306 through which the removal elements 7 exit the first channel segment 300 after delivering the dose D at the delivering position W. The first channel segment 300 and/or the second channel segment 303 may contain a thermally controlled fluid by means of which temperature of the dose D may be kept above a predetermined limit to avoid solidification of the dose D.

Combination of the rods 11 and the first and second channel segments 300, 303 ensures that the mould compressed items are deprived of any unpleasantness and/or substantial disuniformities of structural composition.

As shown in FIG. 2, the punch 5 can be located in the moulding unit 3 below the mould cavity 4. The punch 5 is arranged at the top of a stem 15 integral with the carousel 2.

A pair of levers 16 is associated with the punch 5, each lever 16 supporting an end of a corresponding rod 11. A further pair of levers can be provided on the side of the punch 5 opposite the side shown in FIG. 2. In this case, each end of the rod 11 is supported by a respective lever. In an alternative embodiment, only the two levers 16 may be provided, supporting the rods 11 in a cantilever manner.

The levers 16 are mutually hinged at a point P. One of the levers 16 has an appendage 17 carrying a roller 22.

The mould cavity 4 is fixed to the end of a further stem 18 movable with respect to the carousel 2 towards, and away from, the punch 5. A cam 19 is connected to the mould cavity 4, the cam 19 having the shape of an elongated element extending in the direction F of movement of the mould cavity 4. The cam 19 has a rectilinear portion 20 adjacent to an inclined portion 21.

The mould cavity 4 and the punch 5 are shown in FIG. 2 in the open position. The levers 16 are close one to the other, so as to drive the rods 11 in the dose-receiving position and the dose D has just been delivered to the rods 11.

The mould cavity 4 then starts moving towards the punch 5 as shown in FIG. 3 and reaches a position in which the inclined portion 21 of the cam 19 interacts with the roller 22. The cam 19 causes the levers 16 to oscillate around the point P, so that the rods 11 are moved apart from each other. The shape of the inclined portion 21 and the speed of the mould cavity 4 are so chosen as to cause the levers 16 to open quickly. Thus, the dose D receives a strong thrust and is pushed upwards towards the mould cavity 4.

In the meantime, the mould cavity 4 continues moving towards the punch 5 and, in the position shown in FIG. 4, starts interacting with the punch 5 to shape the dose D. The rods 11 are kept distanced apart from each other by the roller 22 engaging the rectilinear portion 20 of the cam 19.

It is observed that the dose D contacts the rods 11 for a minimum time, which substantially avoids rapid cooling of the dose D and allows the dose D to uniformly cool when interacting with the punch 5 and the mould cavity 4. Defects in the appearance of the cap due to non-uniform cooling of the dose D are therefore substantially avoided.

It is further observed that the levers 16 and the rods 11 extend externally of the mould cavity 4. Thus, there is no need to adopt complicated supporting devices movable inside the mould cavity 4.

Figure 7:
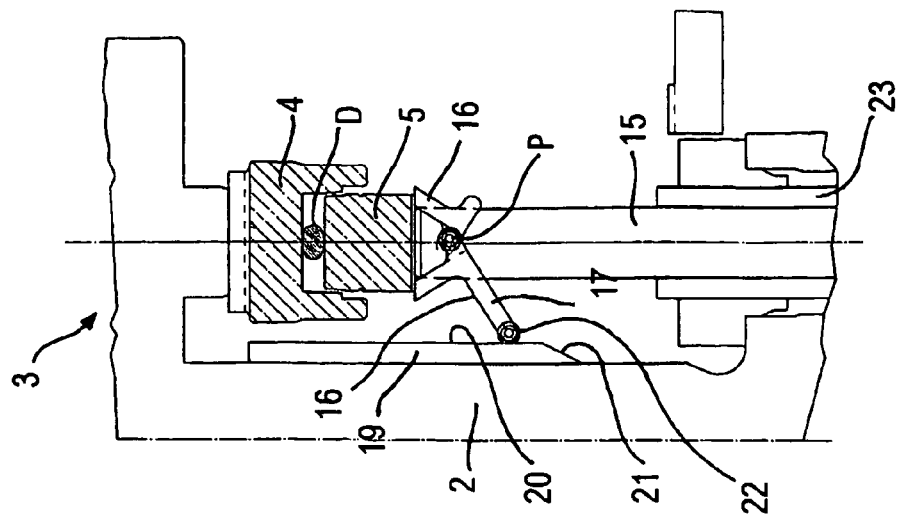
FIGS. 5 to 7 are fragmentary views like FIGS. 2 to 4, showing a moulding unit according to an alternative embodiment.
Figure 6:
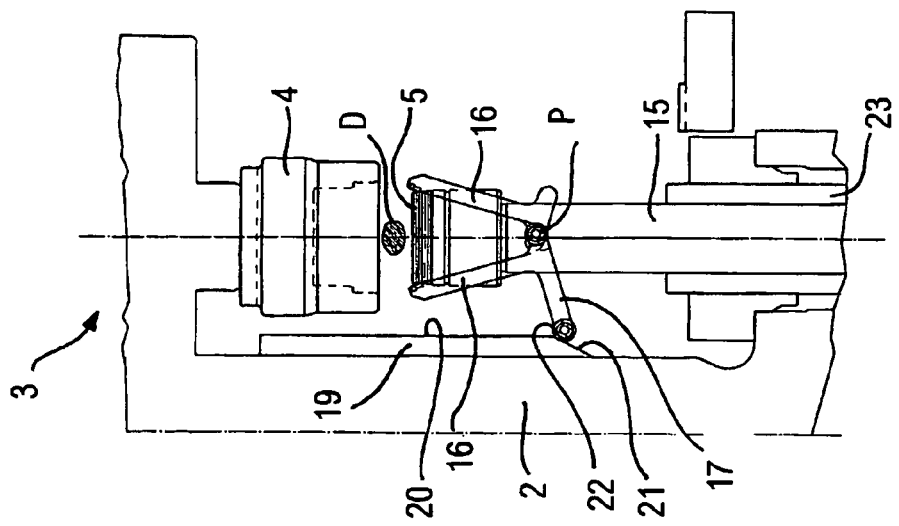
Figure 5:
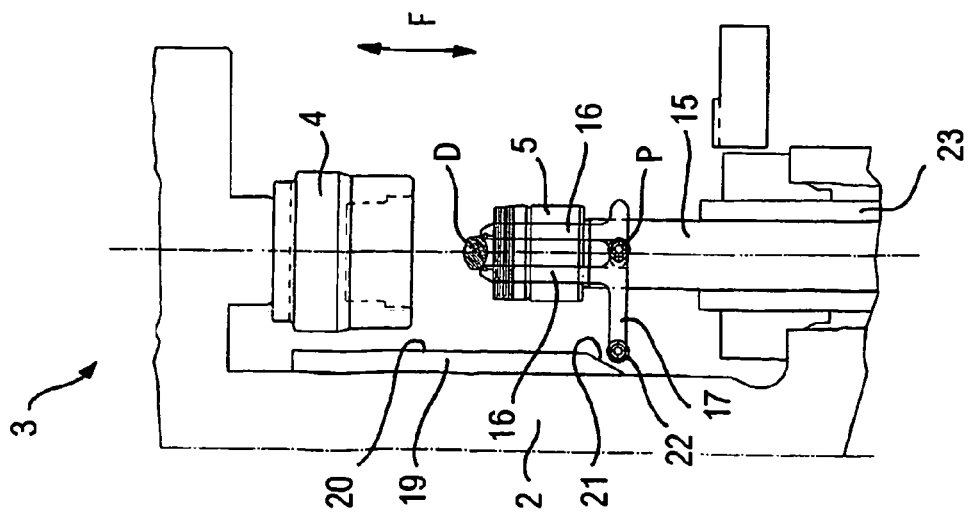

According to the alternative embodiment shown in FIGS. 5 to 7, the cam 19 is fixed to the carousel 2. The stem 15 which supports the punch 5, located below the mould cavity 4, is slidable in a bushing 23 mounted on the carousel 2. Thus, the punch 5 moves in the direction F towards, and away from, the mould cavity 4. The latter is connected to the carousel 2.

FIG. 5 shows the punch 5 and the mould cavity 4 in the open position, with the dose D resting on the rods 11. When the punch 5 moves towards the mould cavity 4, as shown in FIG. 6, the roller 22 interacts with the inclined portion 21 of the cam 19, which causes the levers 16 to suddenly oscillate around the point P, thereby projecting the dose D towards the mould cavity 4. The levers 16 are thereafter kept open by means of the roller 22 engaging the rectilinear portion 20 of the cam 19, thereby allowing the punch 5 to interact with the mould cavity 4 and form the cap from the dose D. This is shown in FIG. 7.

In a further alternative embodiment shown in FIGS. 8 to 10, the mould cavity 4 is positioned below the punch 5. The levers 16 are connected to the mould cavity 4 and are mutually hinged at point P. The mould cavity 4 is stationary with respect to the carousel 2.

The punch 5 is fixed to the stem 15, which is slidingly movable with respect to the carousel 2. Thus, the punch 5 can move in the direction F towards, and away from, the mould cavity 4.

The cam 19 is fixed to a side extension 24 of the punch 5.

Figure 8:
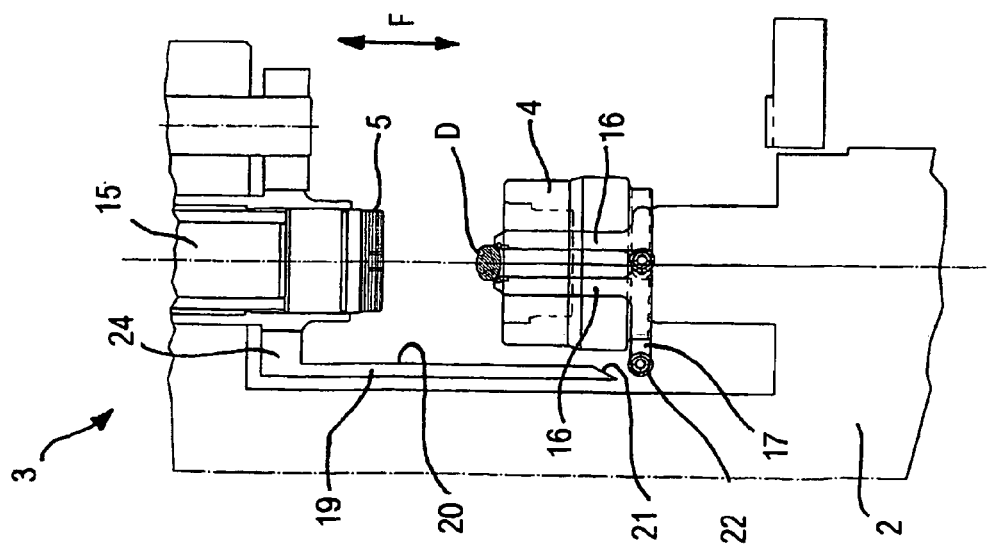

FIG. 8 shows the moulding unit 3 in the open position in which the punch 5 is distanced apart from the mould cavity 4.

The levers 16 are close to one another so that the rods 11, extending above the mould cavity 4, can receive and retain the dose D.

Figure 9:
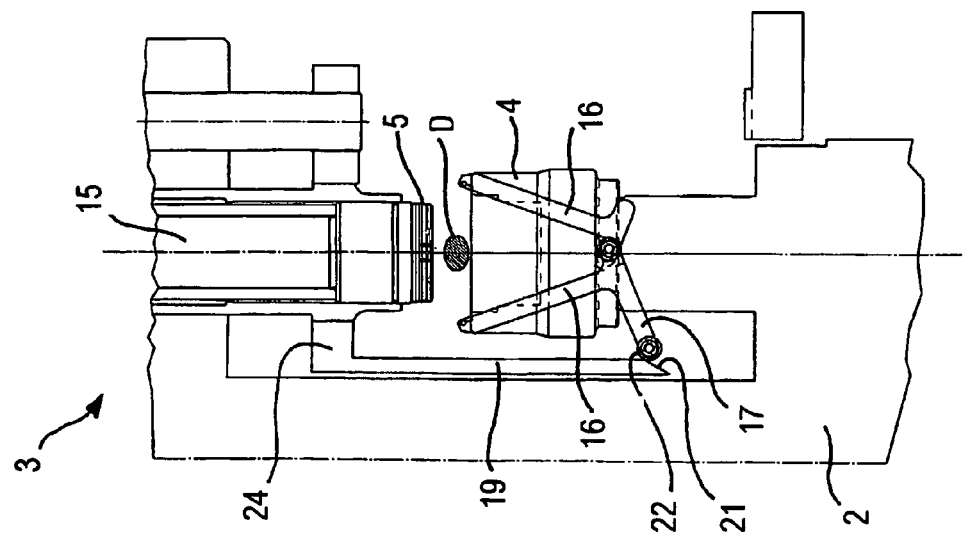

When the punch 5 starts moving towards the mould cavity 4, as shown in FIG. 9, the inclined portion 21 of the cam 19 contacts the roller 22 and causes the levers 16 to open by oscillating around the point P. The quick movement of the levers 16 pushes the dose D towards the punch 5.

Figure 10:
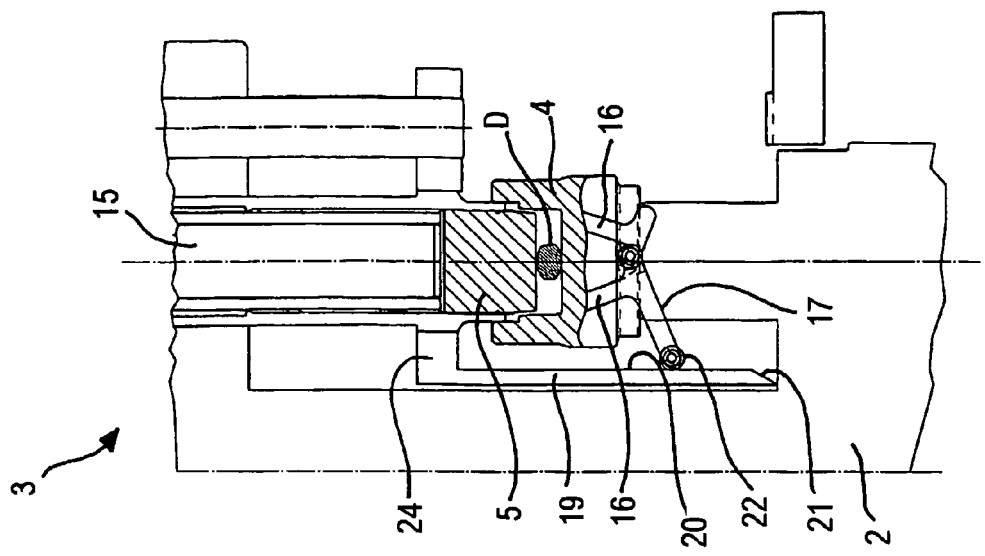
FIGS. 8 to 10 are fragmentary views like FIGS. 2 to 4, showing a moulding unit according to a further alternative embodiment.

The levers 16 are then kept open by the roller 22 interacting with the rectilinear portion 21 of the cam 19, thereby allowing the punch 5 to penetrate inside the mould cavity 4, as shown in FIG. 10, and shape the dose D into a cap.

In a further embodiment, shown in FIGS. 42 to 45, the levers 16 are supported by a holder 52 which is independent of the punch 5 and the mould cavity 4. The holder 52 is slidable along the direction F by means of a non-shown actuating device, for example a cam. The mould cavity 4, positioned below the rods mounted on the levers 16, is also slidingly movable along the direction F, whereas the punch 5 is stationary with respect to the carousel 2. However, the mould cavity 4 and the holder 52 are actuated independently one of another.

Figure 42:
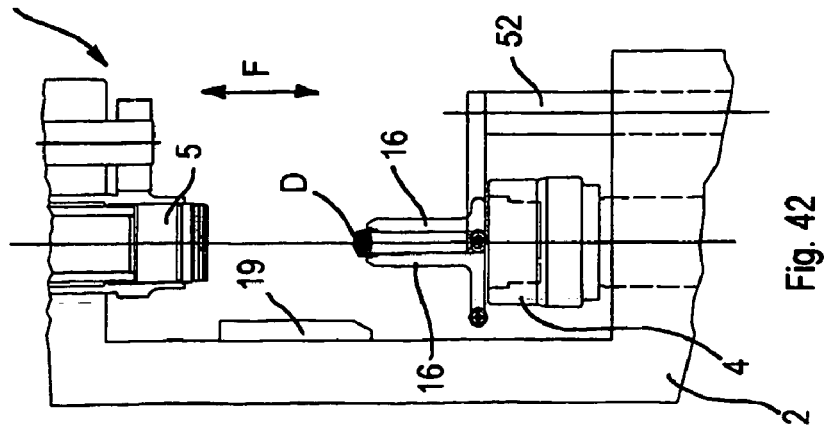

As shown in FIG. 42, the moulding unit 3 is initially in an open position, in which the mould cavity 4 is distanced apart from the punch 5. The holder 52 is in its lowermost position, close to the mould cavity 4. A dose D is then delivered onto the rods mounted on the levers 16.

Figure 45:
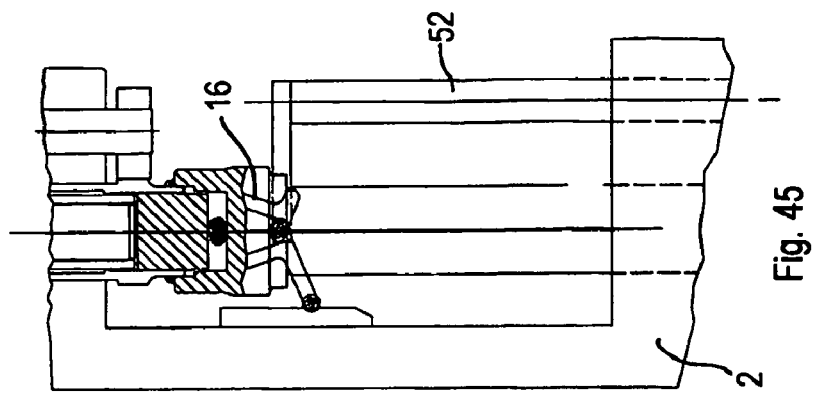
FIGS. 42 to 45 are fragmentary, partially sectioned side views of a moulding unit having rods for supporting a dose which are actuated independently of the mould cavity and the punch.
Figure 44:
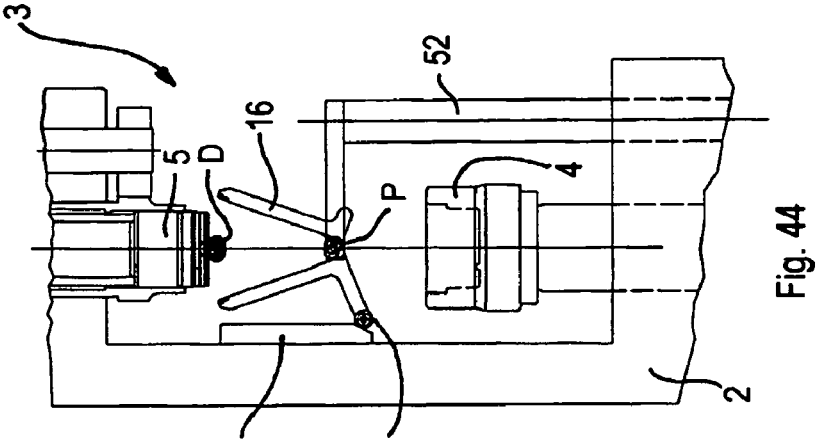
Figure 43:
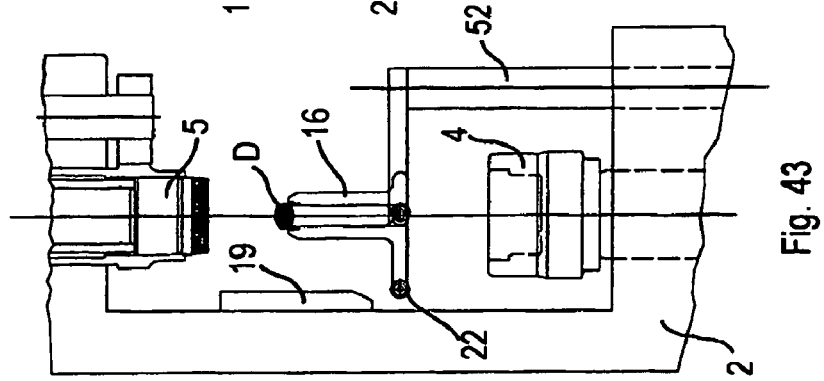

At this point, the holder 52 is actuated upwards, by means of its respective actuating device, and brings the levers 16, the rods and the dose D towards the punch 5, as shown in FIG. 43. The mould cavity 4 is still stationary on the carousel 2. When moving towards the punch 5, the holder 52 reaches a position, shown in FIG. 44, in which the roller 22 contacts the cam 19 that is integral with the carousel 2. The cam 19 rotates the levers 16 around the hinge-point P and the rods are moved away one from another, thereby propelling the dose D against the punch 5. In the meanwhile, the mould cavity 4 has been moved closer to the punch 5 so as to receive the dose D therebetween and then shape the dose D into a cap, as shown in FIG. 45.

By actuating the mould cavity 4 and the levers 16 independently one of another, the dose D can be released by the rods as late as possible. It is thus possible to prevent the dose D from contacting the mould cavity 4 and/or the punch 5 before being compressed, which would undesirably cool the dose D.

It is noted that the independently actuatable rods disclosed in connection with FIGS. 42 to 45 can be used in combination with any mutual arrangement of the punch and mould cavity.

Figure 48:
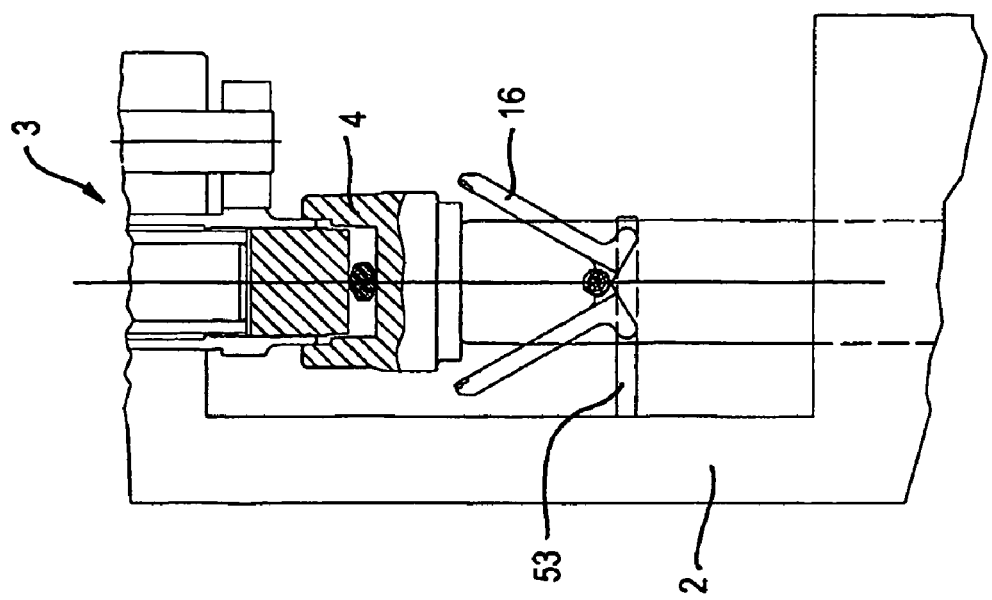
FIGS. 46 to 48 are fragmentary, partially sectioned side views of a moulding unit having rods fixed to a carousel.
Figure 47:
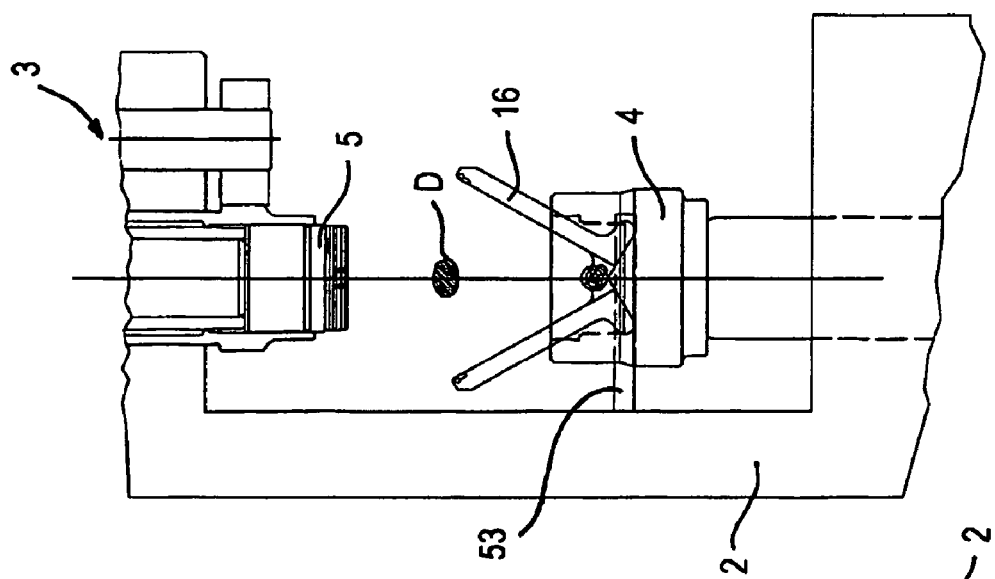
Figure 46:
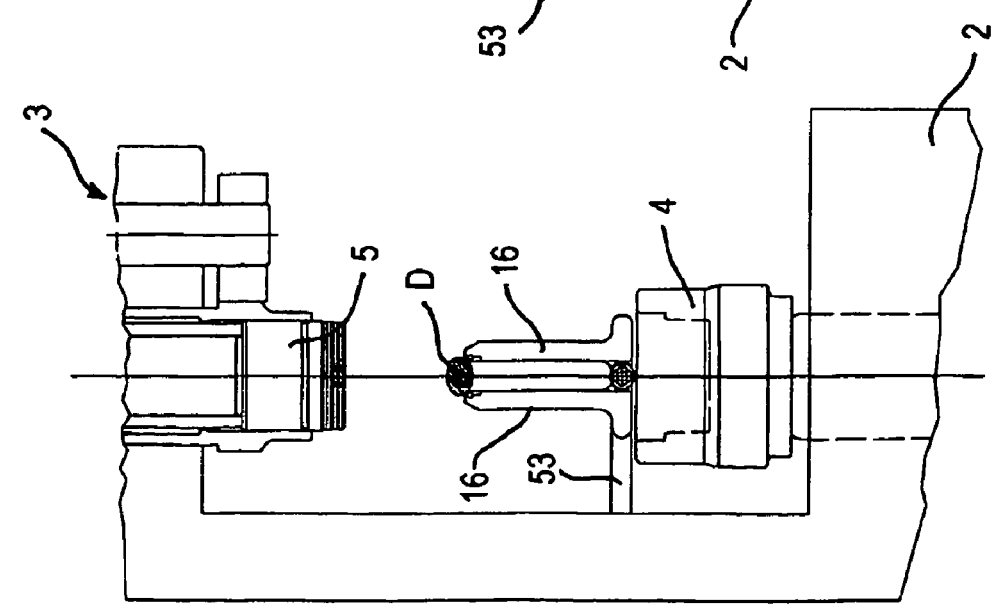

In a still further embodiment, shown in FIGS. 46 to 48, the levers 16 are supported by an arm 53 which is integral with the carousel 2. The arm 53 and the levers 16 are so configured as to allow the mould cavity 4 to pass between two facing pairs of levers 16 without interfering with them.

The mould cavity 4 is slidable in the direction F so as to move away from, and close to, the punch 5. In an initial configuration, the moulding unit 3 is in its open position in which the mould cavity 4 is distanced apart from the punch 5. The mould cavity 4 is below the arm 53 and the levers 16 are kept one close to another, so that the rods mounted on the levers 16 can receive a dose D and support it. The mould cavity 4 is then moved towards the punch 5. In the meanwhile, an actuating arrangement which is not shown causes the levers 16 to open so that the rods suddenly move away one from another and release the dose D between the punch 5 and the mould unit 4, as shown in FIG. 47. The rods are distanced apart one from another so that the mould cavity 4 can pass therebetween, as shown in FIG. 48, in order to reach the punch 5 and interact with it so as to shape the dose D.

It is noted that the arm 53 integral with the carousel 2 disclosed in connection with FIGS. 46 to 48 can be used in combination with any mutual arrangement of the punch and mould cavity.

According to an embodiment shown in FIG. 11, the levers supporting the rods 11 are connected by a connecting rod 25. The latter is hinged at a first end thereof to a first lever 16*a* and, at a second end thereof, to a second lever 16*b*. Both the first lever 16*a* and the second lever 16*b* carry, at respective ends thereof, a corresponding rod 11 for supporting the dose D.

An intermediate portion of the first lever 16*a* is hinged at a point P1 to a protrusion 26 fixed to the carousel 2. An end portion of the first lever 16*a*, opposite the end carrying the rod 11, is rotatably connected to the connecting rod 25.

The second lever 16*b* has a further end portion, opposite the end carrying the rod 11, which is hinged at a point P2 to a further protrusion 27 fixed relative to the carousel 2. An intermediate portion of the second lever 16*b* is rotatably connected to the connecting rod 25.

The first lever 16*a* supports a cam follower 28, which engages a cam track 29 by means of which the movement of the first lever 16*a* can be controlled. The first lever 16*a* in turn actuates the second lever 16*b* by means of the connecting rod 25. In this way, the rods 11 can be moved between the dose-receiving configuration and the dose-delivering configuration.

The actuating system of the levers 16*a*, 16*b* disclosed with reference to FIG. 11 can be associated to any one of the moulding unit arrangements previously described, i.e. having the punch below the mould cavity or vice versa and having a movable punch and a fixed mould cavity or vice versa.

In FIGS. 49 and 50, a moulding unit 3 is shown in which the levers 16 supporting the rods are actuated by a cam 519 having a first portion 560, a second portion 561 adjacent to the first portion 560 and a third portion 562 adjacent to the second portion 561. The cam 519 is integral with the carousel 2. The cam 519 extends along the direction F in which the mould cavity 4 is movable so that, when the mould cavity 4 moves towards the punch 5, the roller 22 interacts first with the first portion 560, then with the second portion 561 and finally with the third portion 562. The first portion 560 protrudes from the carousel 2 to an extent that, when the roller 22 is in contact with the first portion 560, the levers 16 are slightly open, i.e.

they are slightly spaced apart one from another. In this position, which is shown in FIG. 49, a dose D can be delivered onto the levers 16 and rest thereon. As the mould cavity 4 moves towards the punch 5, the roller 22 moves away from the first portion 560 and starts interacting with the second portion 561, which protrudes from the carousel 2 less than the firs portion 560. The levers 16 and the rods connected thereto thereby move closer one to another, so that the dose D, which simply rested on the rods, is pinched between the rods, as shown in FIG. 50. The rods can thus tightly grip the dose D therebetween. The dose D is therefore prevented from detaching from the rods, even if centrifugal forces due to rotation of the carousel 2 act on the dose D.

As the mould cavity 4 moves still closer to the punch 5, the roller 22 starts interacting with the third portion 562, which protrudes from the carousel 2 more than the first portion 560 and the second portion 561. The third portion 562 causes the rods to suddenly move away one from another, thereby delivering the dose D to the mould cavity 4 or to the punch 5, as already explained with reference to FIGS. 9 and 10.

It is noted that the cam arrangement shown in FIGS. 49 and 50 can also be used in a moulding unit in which the mould cavity is above the punch, or in which the mould cavity is stationary and the punch moves away from, and towards to, the mould cavity, or in which both the punch and the mould unity are movable. The direction F might also be non-vertical, e.g. horizontal. Furthermore, the cam might be mounted on a part of the moulding unit different from the carousel.

FIGS. 12 to 18 show an embodiment in which the rods 111 are movable between the dose-receiving configuration and the dose-delivering configuration by oscillating around respective axes extending parallelly to the axis A of the carousel 2. Each rod 111 is fixed to a respective supporting bar 30 having a circular cross-section provided with a flat surface 31. The flat surface 31 is shapingly coupled to an end portion of the respective rod 111 and prevents the rod 111 from rotating with respect to the bar 30.

The bars 30 are connected to one other by means of a connecting device 32, allowing the bars 30 to oscillate synchronously.

The connecting device 32 supports a cylinder 33 which engages a flat cam 34.

As shown in FIG. 13, the flat cam 34 has a straight portion 35 and a further straight portion 36, parallel to the straight portion 35 and distanced apart therefrom. The straight portion 35 and the further straight portion 36 are connected one to another by an oblique portion 37.

Figure 16:
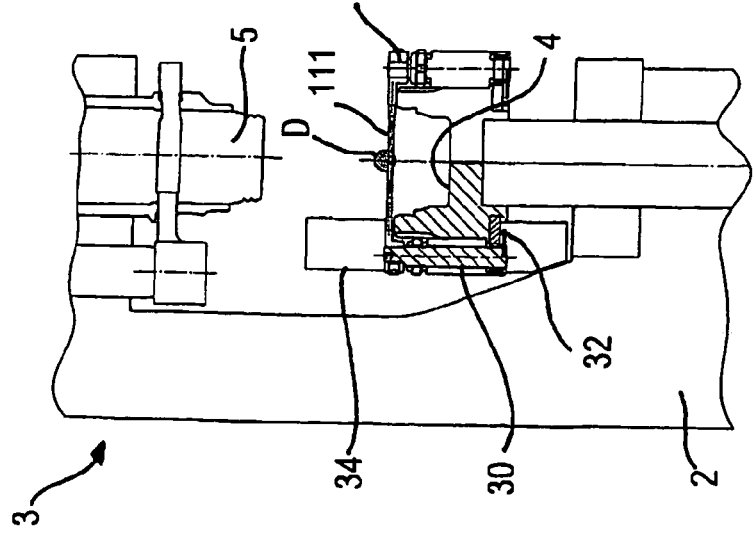

When the cylinder 33 engages the straight portion 35, as shown in FIG. 15, the rods 111 are in the dose-receiving configuration shown in FIG. 14 and can support the dose D between the punch 5 and the mould cavity 4 distanced apart one from the other, as shown in FIG. 16.

Figure 18:
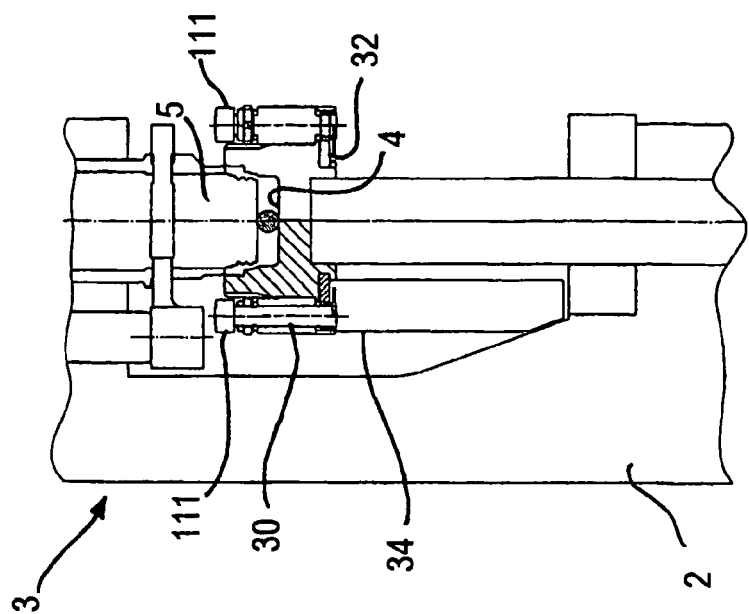
FIGS. 16 to 18 are fragmentary, partially sectioned side views of a moulding unit provided with the supporting members of FIGS. 12 to 15.
Figure 17:
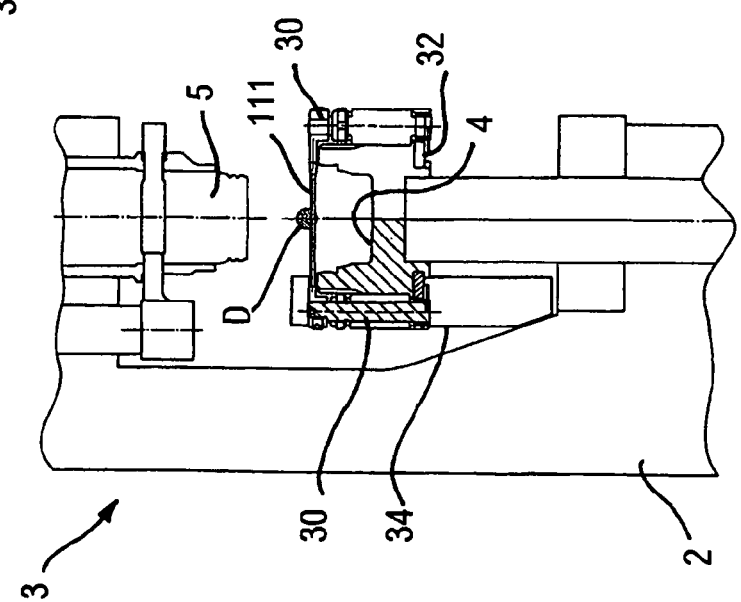

Subsequently, the mould cavity 4 is moved towards the punch 5, as shown in FIG. 17. The cylinder 33 thus engages first the oblique portion 37 and then the further straight portion 36, as shown in FIG. 13. The further straight portion 36 forces the cylinder 33 to oscillate the connecting device 32 around the axis of the punch 5. The connecting device 32 oscillates in turn the bars 30, which causes the rods 111 to reach the dose-delivering configuration shown in FIG. 12. In this configuration, the dose D is released between the mould cavity 4 and the punch 5, which then interact to form the cap, as shown in FIG. 18.

It is observed that the rods 111 oscillatable around respective axes parallel to the axis of the carousel 2 may be used in combination with any mutual arrangement of the mould cavity and punch.

In the embodiment shown in FIG. 19, the rods 111 are actuated by a gear device including a sector gear 38 integral with the connecting device 32. As the carousel 2 rotates around the axis A, the sector gear 38 cyclically interacts with a further sector gear 39 arranged in a fixed position on the apparatus 1. The sector gear 38, when matching the further sector gear 39, moves the rods 111 between the dose-receiving configuration shown in FIG. 19 and the dose-delivering configuration.

It is stressed that the gear device disclosed in connection with FIG. 19 can be used in combination with any mutual arrangement of the punch and mould cavity.

FIGS. 20 and 22 show a moulding unit 3 associated with a transferring wheel 40 rotatable about an axis perpendicular to the axis along which the mould cavity 4 is movable. The transferring wheel 40 is peripherally provided with a plurality of removal members 41, having a U-shaped cross-section.

As the transferring wheel 40 rotates around its respective axis, each removal member 41 interacts with an extrusion device 42 and removes therefrom a respective dose D. The removal member 41 delivers the dose D onto the rods 11 extending above a part of the moulding unit 3, namely above the mould cavity 4 in the particular case shown in FIG. 20.

The carousel 2 then moves the moulding unit 3 away from the transferring wheel 40 and, in the particular case shown in FIG. 21, the mould cavity 4 can be actuated upwards towards the punch 5.

Figure 23:
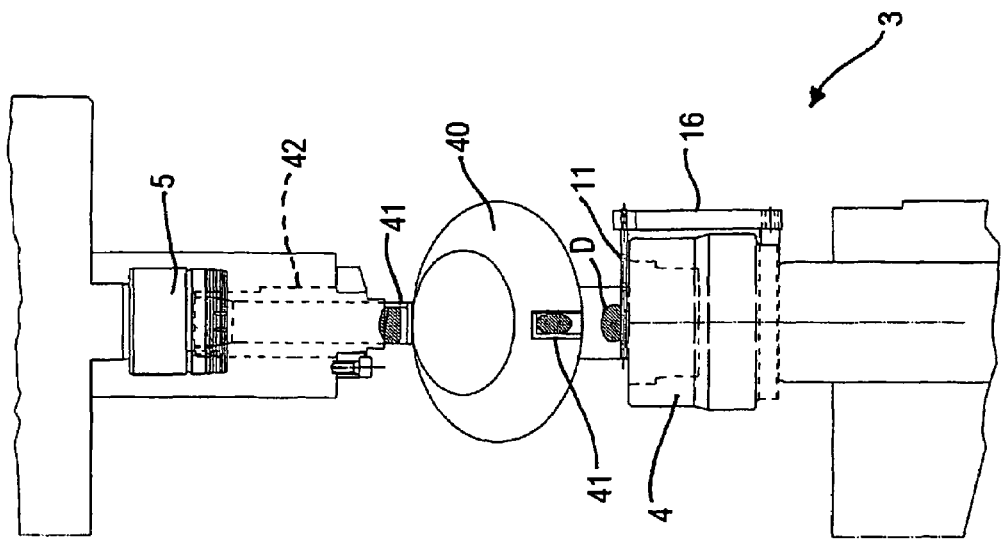
FIG. 23 is a view like FIG. 20, in which the transferring device rotates around an inclined axis.
Figure 24:
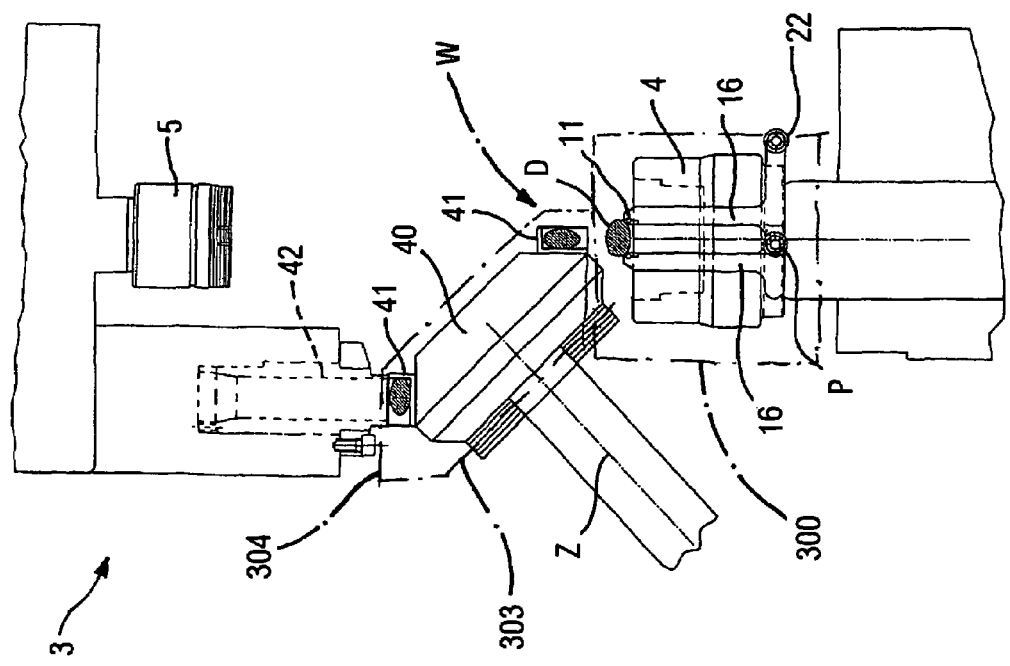
FIG. 24 is a side view of the transferring device shown in FIG. 23.

FIGS. 23 and 24 show a version in which the transferring wheel 40 is rotatable around an axis Z which is inclined of about 45° with respect to the axis of rotation of the carousel 2. Owing to this arrangement of the axis Z, it is possible to remove the dose D from an extrusion device 42 having an extrusion axis parallel to the axis of the carousel 2 and to transfer the dose D onto the rods 11 of a moulding unit 3.

It is observed that the transferring wheel 40 may be used in combination with any mutual arrangement of the punch and moulding cavity previously disclosed.

In the embodiment shown in FIGS. 25 and 26, a transferring wheel 140, rotatable about an inclined axis Z1, is used to transfer a dose D1 of plastics from an extrusion device 142 to a cap 43. The dose D1 inside the cap 43 is then formed by a forming device not shown so as to obtain a sealing element in the cap 43. The sealing element avoids loss of content from the container or bottle closed by the cap 43.

The transferring wheel 140 is peripherally provided with a plurality of removal members 141 having a leading, cutting edge 44 which detaches the dose D1 from the extrusion device 142. The doses D1 removed from the extrusion device 142 by subsequent removal members 141 are then transferred onto respective caps 43 moved along an advancement direction F1 by a conveyor 45.

Figure 27:
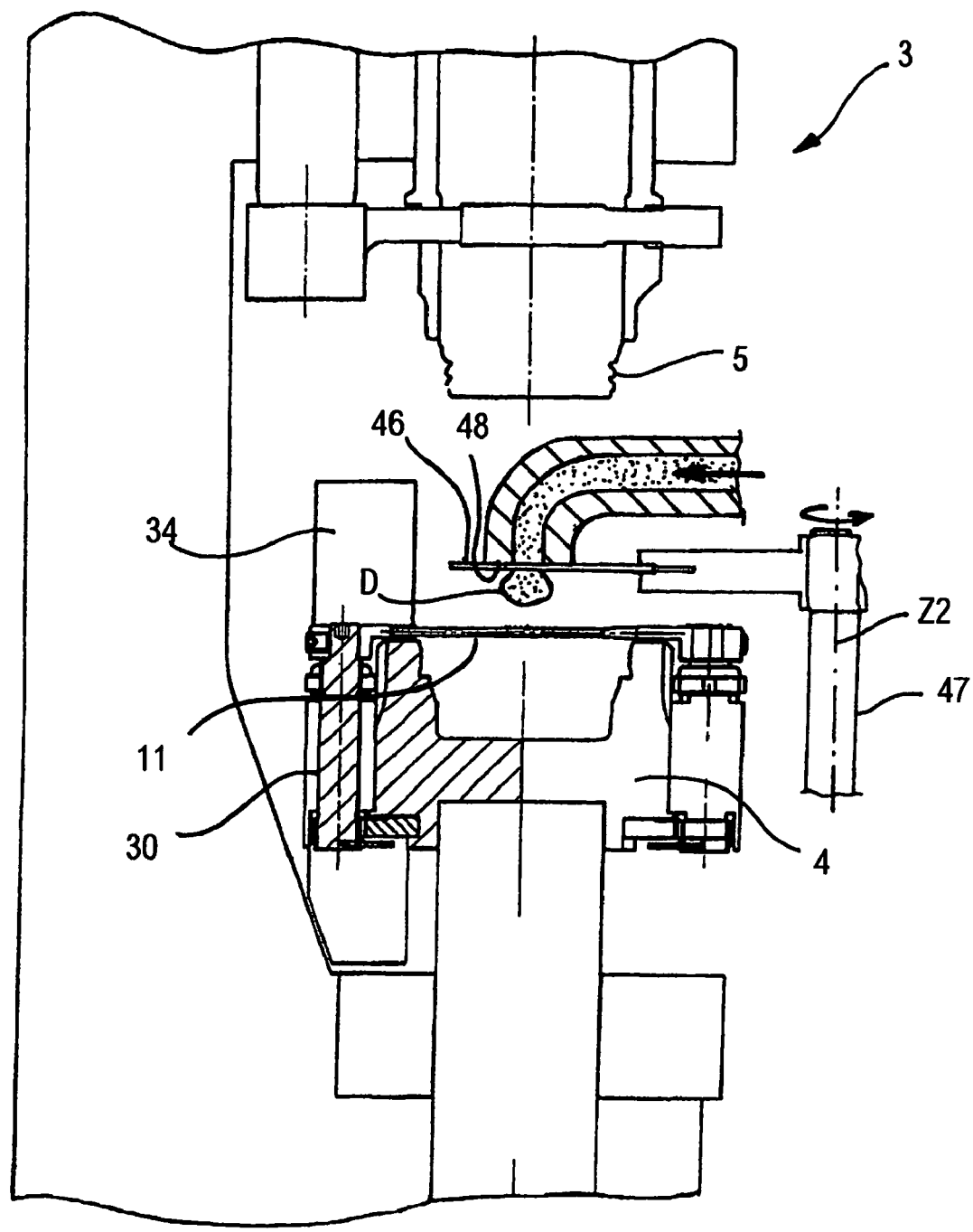
FIG. 27 is a partially sectioned, fragmentary side view of a moulding unit cooperating with a severing arrangement to sever a dose of plastics material from an extruder.

FIG. 27 shows a moulding unit 3 cooperating with a severing arrangement including a blade 46 mounted on a shaft 47 rotatable about an axis Z2. The blade 46 periodically interacts with an extruder mouth 48 and severs therefrom the dose D of plastics, which falls onto the underlying rods 11.

The moulding unit 3 is then moved away from the extruder mouth 48, for example by rotating around the axis of the carousel 2.

The dose D is released between the punch 5 and the mould cavity 4 when the rods 11 move from the dose-receiving configuration to the dose-delivering configuration.

Figure 28:
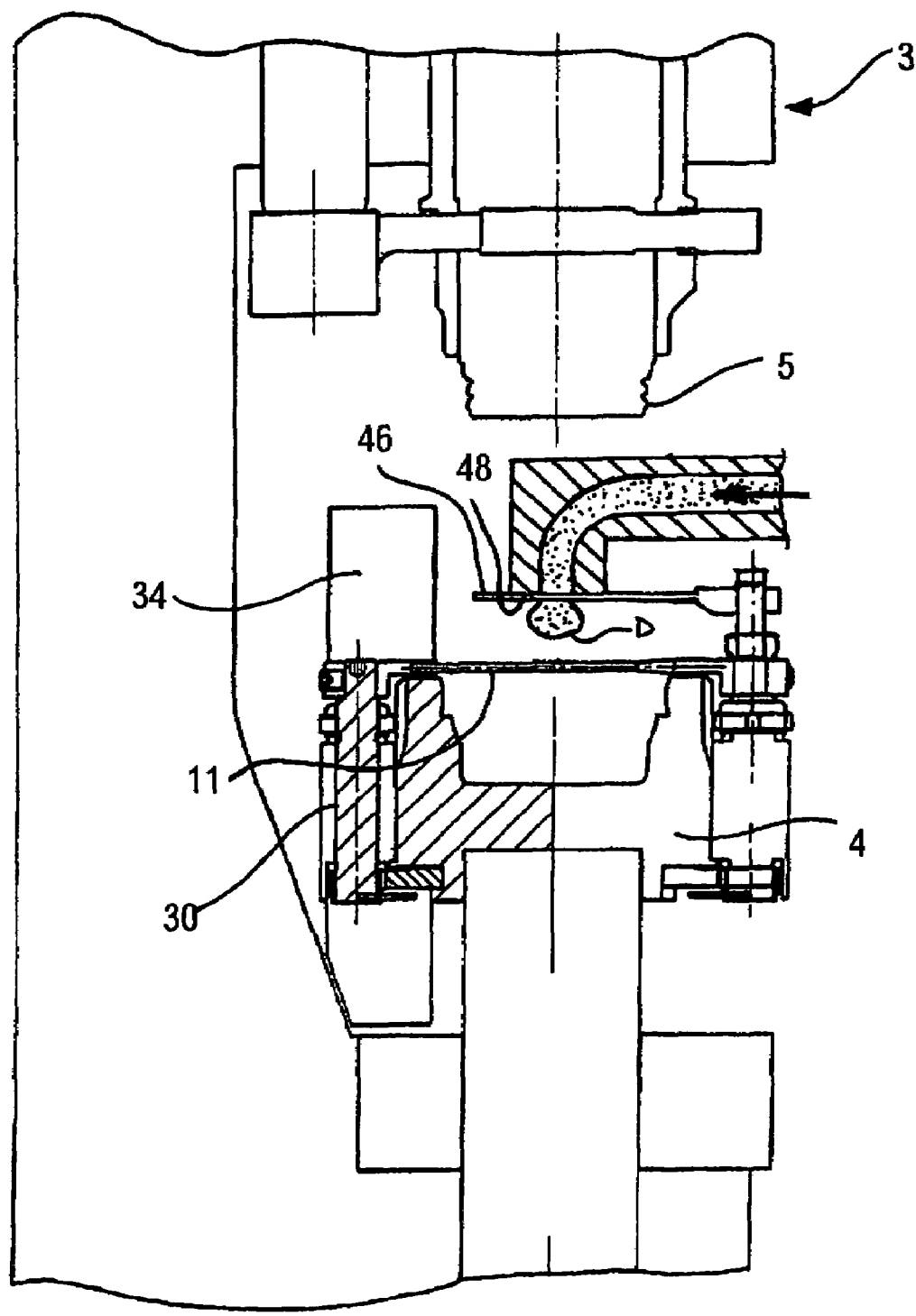
FIG. 28 is a view like FIG. 27, showing a different embodiment of the moulding unit.

The blade 46 may also be associated to the moulding unit 3, as shown in FIG. 28. In this particular case, the blade 46 is connected to the mould cavity 4 and moves synchronously with the rods 11 so as to periodically interact with the extruder mouth 48 and sever therefrom the dose D.

The severing arrangement shown in FIGS. 27 and 28 is associated with rods 11 of the type shown in FIGS. 12 to 18. However, the severing arrangement might also be used in combination with other supporting arrangements and/or with different relative arrangements of the punch and the mould cavity.

Figure 31:
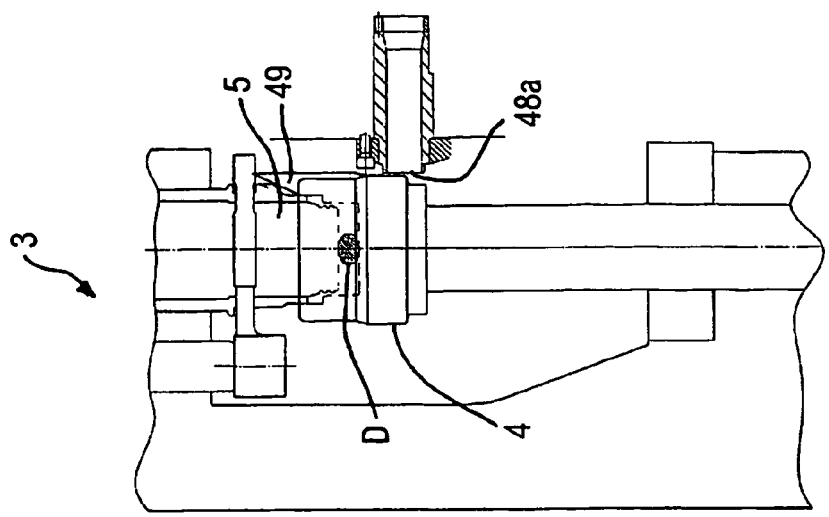
FIGS. 29 to 31 are fragmentary, partially sectioned side views of a moulding unit provided with a severing knife to sever the dose of plastics material from the extruder.
Figure 30:
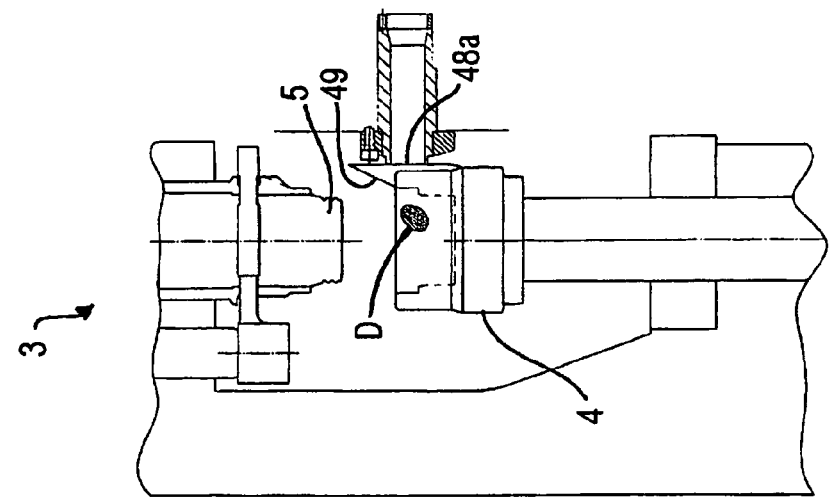
Figure 29:
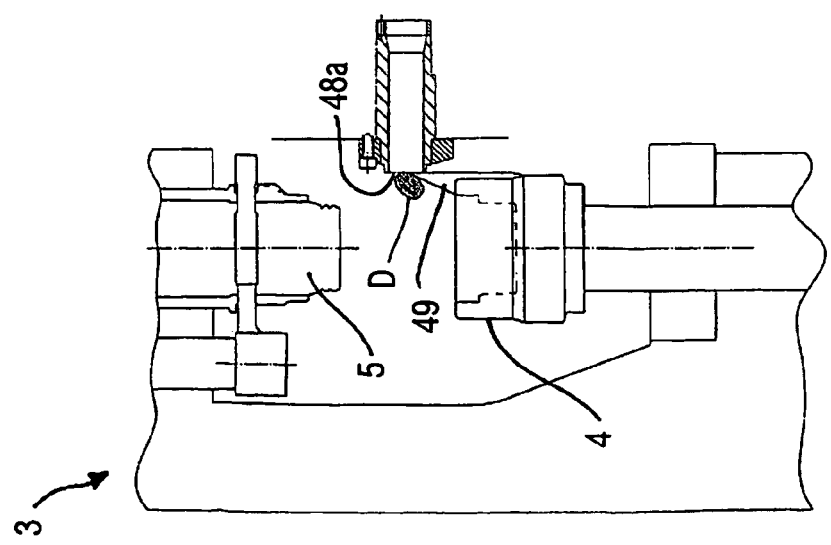

FIGS. 29 to 31 disclose a severing arrangement according to another embodiment. In this embodiment, the mould cavity 4 is movable towards, and away from, the punch 5 which is located above the mould cavity 4. A knife 49 having a substantially triangular shape is fixed to a side of the mould cavity 4.

When the mould cavity 4 is raised towards the punch 5, the knife 49 interacts with an extruder mouth 48a, feeding the plastics along a horizontal extrusion axis. As shown in FIG. 29, the knife 49 severs from the extruder mouth 48a the dose D, which then falls into the mould cavity 4 due to gravity. The knife 49, owing to its triangular shape, also acts as a guide guiding the dose D towards the centre of the mould cavity 4.

The mould cavity 4 finally reaches the closed position shown in FIG. 31, in which a cap is formed.

The severing arrangement allows the moulding apparatus to be simplified, because the extruder mouth can be located adjacent to the moulding units and there is no need to provide a transferring device for transferring the doses from the extruder mouth to the moulding unit.

In the embodiment shown in FIGS. 29 to 31, the moulding apparatus can be even simpler, since the supporting arrangement may be eliminated.

A severing arrangement of the type described above may also be used in combination with a horizontal moulding unit 3a, as disclosed in FIG. 32 to 35.

The moulding unit 3a includes a mould cavity 4a, cooperating with a punch 5a movable with respect to the mould cavity 4a along a horizontal direction H. The punch 5a is provided, on a side thereof facing upwards, with a knife 49a. A cam 19a is fixed to the punch 5a at a side thereof opposite the side supporting the knife 49a.

The mould cavity 4a is provided with a pair of levers 216 hinged at a point P on the lower part of the mould cavity 4a. The levers 216 are L-shaped, and each of them includes a first arm 50 extending along the horizontal direction H, and a second arm 51 perpendicular to the first arm 50. The rods 11a are supported at respective ends of the second arms 51.

One of the levers 216 has an appendage 17a supporting a roller 22a. An extruder mouth 48b is arranged above the moulding unit 3a.

Figure 32:
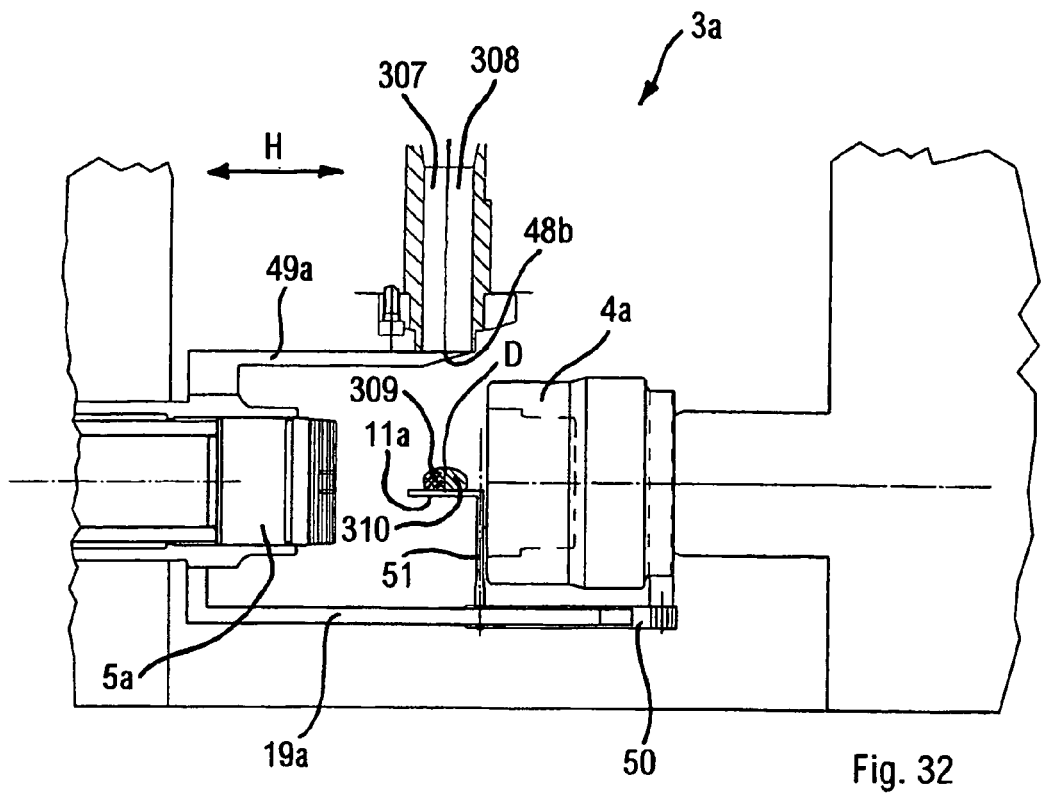
FIGS. 32 to 35 are fragmentary, partially sectioned side views of a moulding unit having a punch movable along a horizontal axis, in subsequent moulding steps.

As shown in FIG. 32, the extruder mouth 48b is defined by terminal portions of a first conduit 307 and a second conduit 308 belonging to first and second extruders, not shown, processing a first plastics and a second plastics.

In this way, outside the mouth 48b the dose D comprises a first portion 309 made from the first plastics and a second portion 310 made from the second plastics.

Figure 41:
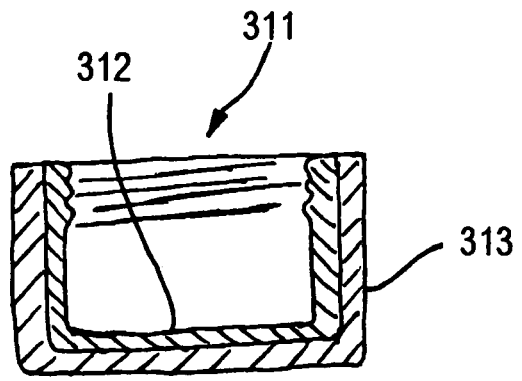
FIG. 41 is a schematic cross-section taken along the axis of a compression moulded screw cap made from two distinct kinds of plastics.

It is observed that while the first portion 309 faces the punch 5a, the second portion 310 faces the mould cavity 4a, in such a way that when the punch 5a and the mould cavity 4a are brought together to form a screw cap 311 (shown in FIG. 41), the first portion 309 originates an inner wall 312 of the screw cap 311, while the second portion 310 originates an outer wall 313 of the screw cap 311. Thus, it is possible to manufacture a multi-layered screw cap 311, in which for example, the inner wall 312 is made from a material having peculiar barrier properties and the outer wall 313 has peculiar mechanical, or chemical, or physical properties.

Figure 33:
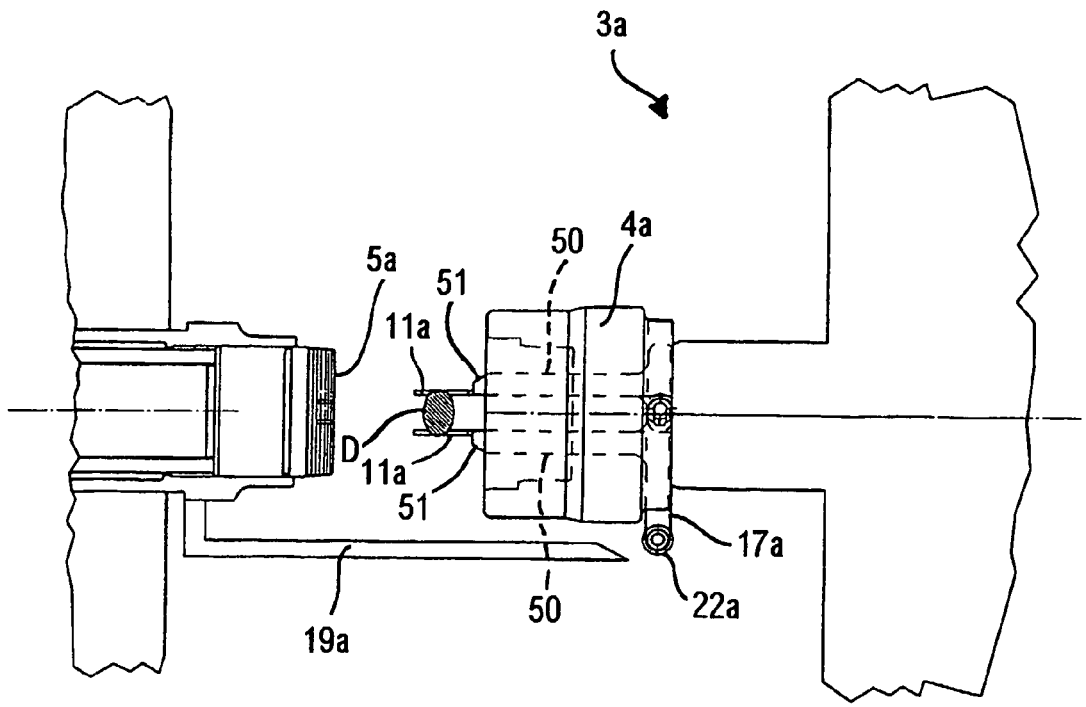
Figure 34:
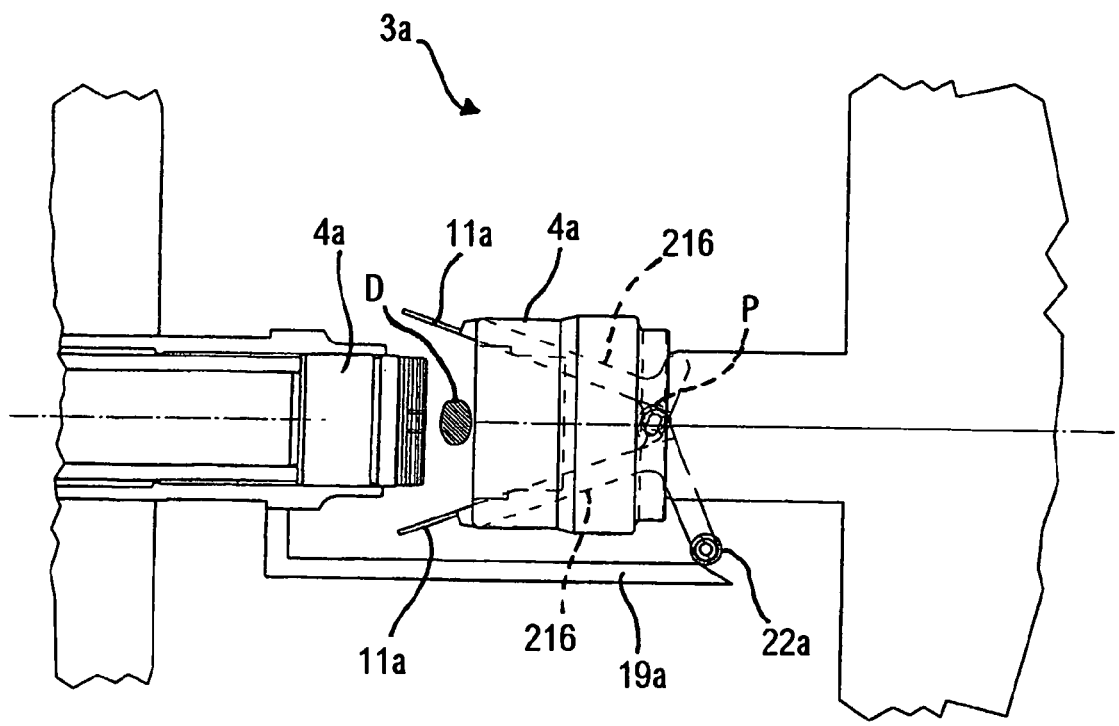
Figure 35:
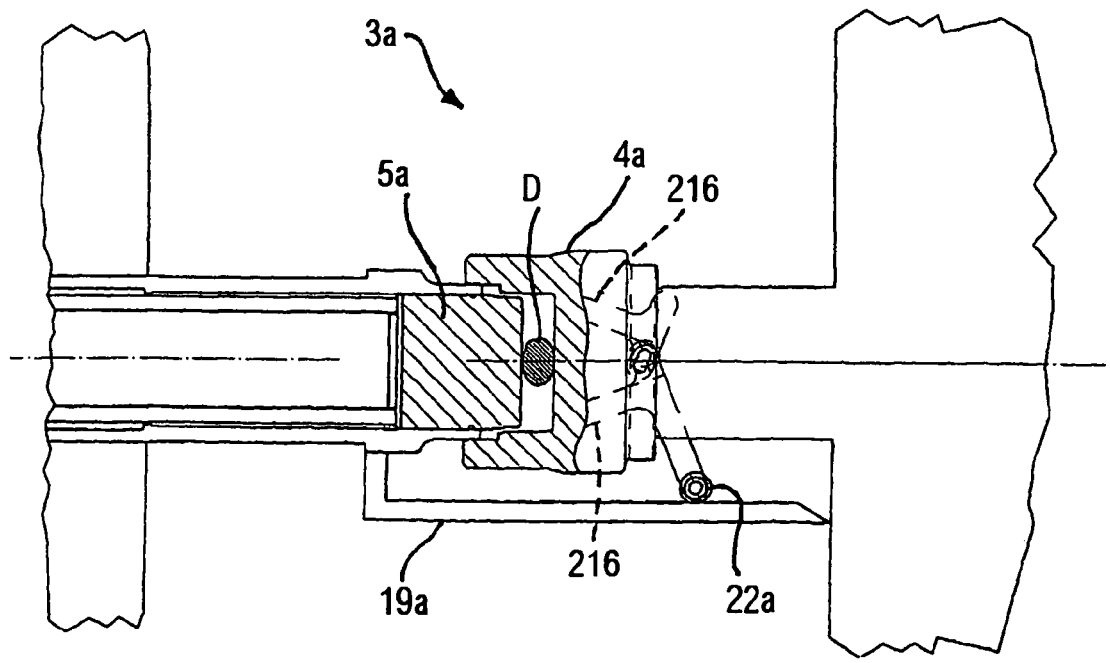

The moulding unit 3a may also be used to manufacture items, for example caps, from a single plastics, as shown in FIGS. 33 to 35 in which the dose D is made of a single material.

When the punch 5a moves towards the mould cavity 4a, the knife 49a interacts with the extruder mouth 48b and severs therefrom a dose D of plastics. The dose D falls onto the underlying rods 11a, which are close to one another in the dose-receiving configuration. This can be seen in a side view in FIG. 32 and in a plan view in FIG. 33.

As the punch 5a continues moving towards the mould cavity 4a, the roller 22a engages the cam 19a, which causes the levers 216 to open by oscillating around the point P. The dose D remains therefore free in the space between the punch 4a and the mould cavity 5a, as shown in FIG. 34.

Subsequently, the punch 5a moves closer to the mould cavity 4a so as to compress the dose D and shape it as a cap, as shown in FIG. 35.

Figure 36:
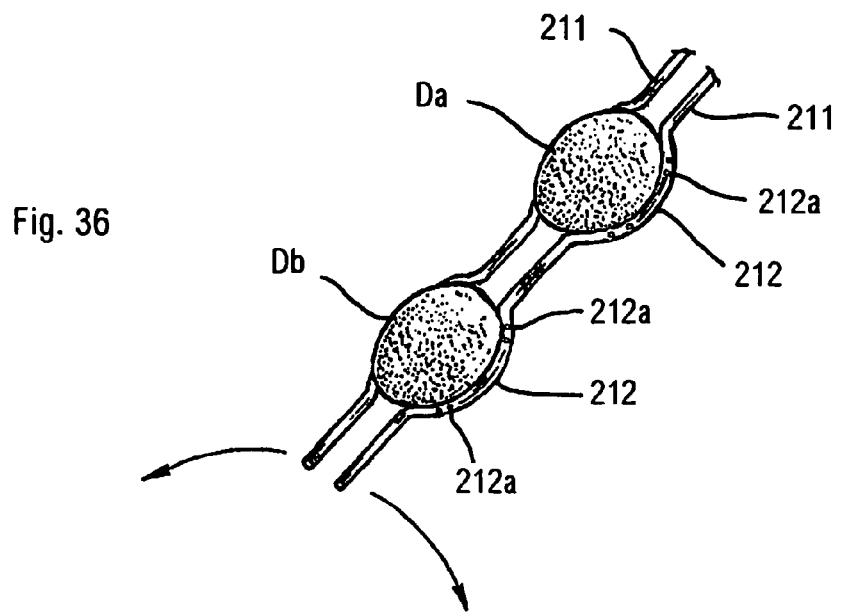
FIG. 36 is a perspective, schematic view of a supporting arrangement supporting two doses of plastics.

FIG. 36 shows a supporting arrangement provided with a pair of rods 211, each of which is provided with two adjacent curved portions 212 for receiving two doses Da and Db therebetween.

The doses Da and Db can be of plastics having properties or colours differing from each other and can be subsequently released between a mould cavity and a punch to obtain a compression moulded article provided with a body of two different plastics.

The curved portions 212 allow the doses Da and Db to be properly positioned on the rods 211; however, their presence is not essential and straight rods might be used in place of the rods 211 shown in FIG. 36. The rods 211 and the curved portions 212, if any, may be of any porous material and/or are optionally provided with holes 212a oriented towards the doses Da, Db to inject a fluid thereagainst and keep the same under controlled conditions.

On the other hand, rods provided with curved portions might replace the rods 11, 111, 11a described with reference to the previous drawings.

Figure 37:
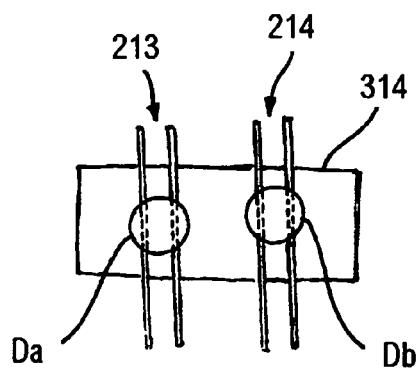
FIG. 37 is a plan view of a supporting arrangement including two pairs of supporting members for supporting two doses of plastics material.

As shown in FIG. 37, the doses Da, Db may also be supported by two pairs of rods 213, 214, which can be opened to release the doses, for example when a mould cavity 314 is used having an elongated plan shape.

Figure 38:
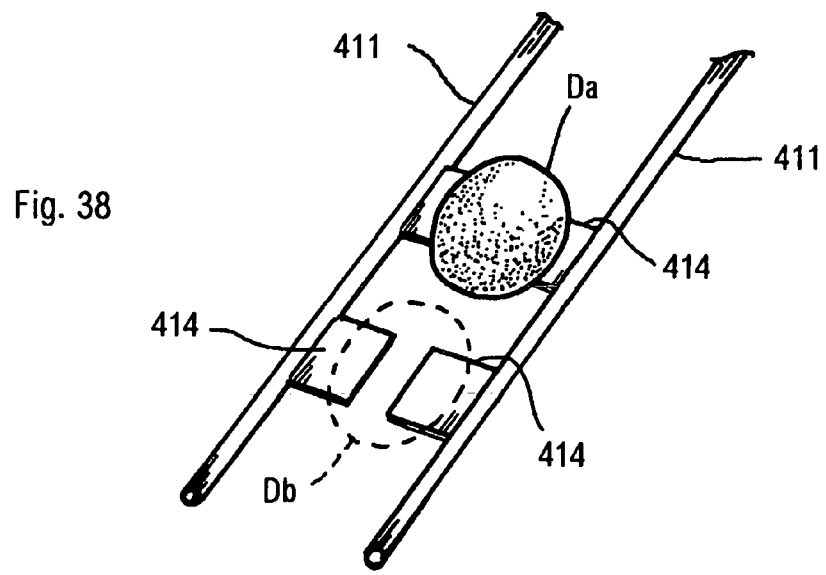
FIG. 38 is a perspective, schematic view of a supporting arrangement supporting two doses of plastics, according to an alternative embodiment.

FIG. 38 shows an alternative embodiment in which rods 411 are provided for supporting a pair of doses Da, Db. To this end, each rod 411 is provided with two supporting plates 414 protruding towards corresponding supporting plates fixed to the other rod. Each dose Da, Db is received on a pair of facing supporting plates 414 and rests thereon until it is delivered to the mould cavity and/or to the punch.

Figure 40:
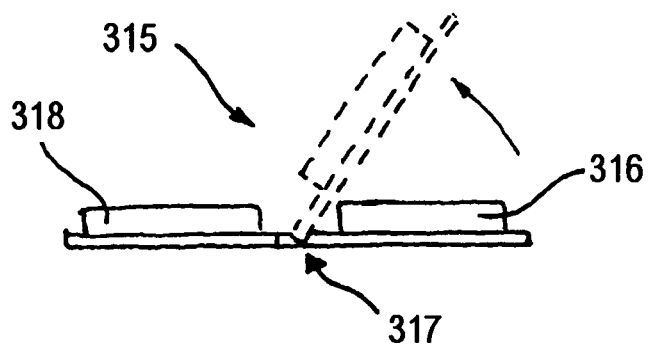
FIG. 40 is a schematic side view of a hinge closure made from two kinds of plastics.

If the doses Da and Db are of different materials, a hinge closure 315, as shown in FIG. 40, can be obtained in which a first closure portion 316 is made from a particularly flexible material occupying a hinge region 317, adjacently joined with a second closure portion 318 for fitting with a container not shown and made from a material compatible with the material from which the container is made in the fitting region therewith.

Figure 39:
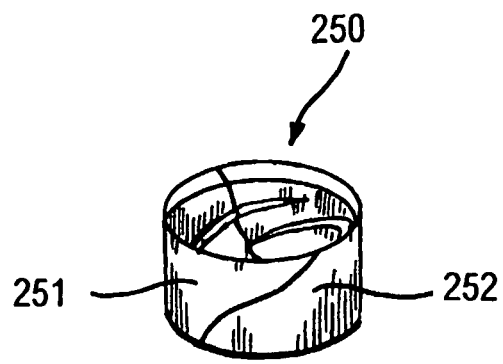
FIG. 39 is a perspective view of a compression moulded screw cap made from two distinct kinds of plastics.

FIG. 39 shows a screw cap 250 whose bottom and side walls are made from a first material 251 and a second material 252, both of plastics, but having different colours.

It is also possible to use rods having curved portions like those shown in FIG. 36 or supporting plates like those shown in FIG. 38 to support one single dose.

It is to be understood that in the above description the mould cavities and/or the punches may be driven by any suitable driving arrangement, such as pneumatic and/or hydraulic cylinders, or electro-magnetic linear actuators.

Furthermore, the mould cavity and the punch may have any desired shape other than circular.

The supporting arrangement may also comprise heated rods, so that the temperature of the dose may be accurately controlled. The rods may be heated, for example, by means of resistors, or by induction, or by means of a jet of fluid, for example air.

Heating the supporting arrangement, or providing the same with tubular rods, or rods of porous material through which a pressurized fluid can be injected, makes possible to ensure that detachment of the dose from the supporting arrangement occurs in any working conditions; in fact sticking of the dose to the supporting arrangement is avoided.

The supporting arrangement may include rods that are coated with a nonstick material, for example polytetrafluoroethylene (Teflon). The nonstick material allows the dose to be easily detached from the rods, since it prevents the dose from sticking to the rods. Compression moulded items having a uniform appearance and uniform properties can thereby be obtained, because the portion of plastics which was in contact with the rods cannot be nearly distinguished in the finished item.

It is also to be understood that the features disclosed in the description of the Figures with reference to a specific embodiment may be claimed also in connection with any other embodiments disclosed or even per se.

The invention claimed is:

1. Apparatus, comprising a moulding unit having a punch and a cavity mould movable along a path between an open position in which said punch and said cavity mould are distanced apart from each other to receive a dose of plastics therebetween, and a closed position in which said punch and said cavity mould are aligned and interact to form an item by pressing said dose, said punch being kept at a height which is not greater than the height of said cavity mould along said path, the apparatus further comprising a supporting arrangement for supporting said dose, said supporting arrangement extending externally of said cavity mould for supporting said dose between said punch and said cavity mould in said open position.

2. Apparatus according to claim 1, wherein said punch is placed under said cavity mould.

3. Apparatus according to claim 1, wherein said punch and said cavity mould are placed on a common horizontal plane.

4. Apparatus according to claim 1, wherein said cavity mould is movable between said closed position and said open position.

5. Apparatus according to claim 1, wherein said punch is movable between said closed position and said open position.

6. Apparatus according to claim 1, wherein said moulding unit is mounted on a rotating carousel.

7. Apparatus according to claim 1, wherein said supporting arrangement is driven by a cam arrangement.

8. Apparatus according to claim 6, wherein said supporting arrangement is driven by a cam arrangement.

9. Apparatus according to claim 7, wherein said cam arrangement is fixed to said punch.

10. Apparatus according to claim 7, wherein said cam arrangement is fixed to said cavity mould.

11. Apparatus according to claim 8, wherein said cam arrangement is fixed to said carousel.

12. Apparatus according to claim 1, wherein said supporting arrangement comprises a pair of rods connected to a respective pair of levers hinged at a base body, each lever of said pair of levers being connected to the other lever of said pair of levers by a connection rod.

13. Apparatus according to claim 1, wherein said supporting arrangement can be oscillated by a gear device.

14. Apparatus according to claim 1, wherein said supporting arrangement comprises a supporting member which is movable between a dose-receiving configuration in which said supporting member is so arranged as to retain said dose and a dose-delivering configuration in which said supporting member is so arranged as to deliver said dose to said moulding unit.

15. Apparatus according to claim 7, wherein said supporting arrangement comprises a supporting member which is movable between a dose-receiving configuration in which said supporting member is so arranged as to retain said dose and a dose-delivering configuration in which said supporting member is so arranged as to deliver said dose to said moulding unit.

16. Apparatus according to claim 15, wherein said cam arrangement has a first portion for driving said supporting member and a further supporting member in said dose-receiving configuration and a second portion for driving said supporting member and said further supporting member in a dose-pinching configuration in which said dose is pinched between said supporting member and said further supporting member, said second portion being adjacent to said first portion.

17. Apparatus according to claim 15, wherein said supporting member can be oscillated parallelly to an axis along which said punch and said cavity mould are movable.

18. Apparatus according to claim 15, wherein said supporting member is made from porous material.

19. Apparatus according to claim 15, wherein said supporting member comprises a tubular supporting member having holes through which a fluid can be injected toward said dose.

20. Apparatus according to claim 15, wherein said supporting member is made from thermally substantially non-conductive material.

21. Apparatus according claim 15, wherein said supporting member is substantially L-shaped.

22. Apparatus according to claim 15, wherein said supporting member is coated by a substantially non stick material.

23. Apparatus according to claim 1, wherein said supporting arrangement is mounted on said punch.

24. Apparatus according claim 1, wherein said supporting arrangement is mounted on said cavity mould.

25. Apparatus according to claim 1, wherein said supporting arrangement is actuated along said path independently of said cavity mould and/or said punch.

26. Apparatus according to claim 8, wherein said supporting arrangement is mounted on said carousel.

27. Apparatus according to claim 1, and further comprising a dose-delivering mouth of an extruder interposed between said punch and said cavity mould in said open position.

28. Apparatus according to claim 27, wherein a severing arrangement co-operates with said dose-delivering mouth (so as to sever said dose from said extruder.

29. Apparatus according to claim 28, wherein said severing arrangement is mounted on said moulding unit.

30. Apparatus according to claim 28, wherein said severing arrangement is rotatable around a respective axis.

31. Apparatus according to claim 30, wherein said severing arrangement is driven by an independent motor unit.

32. Apparatus according to claim 25, and further comprising a dose-delivering mouth of an extruder interposed between said punch and said cavity mould in said open position.

33. Apparatus according to claim 32, wherein said severing arrangement is provided with a blade connected to said supporting member.

34. Apparatus according claim 28, wherein said severing arrangement is provided with a knife mounted on said punch or on said cavity mould.

35. Apparatus according to claim 1, wherein in said open position in which said punch and said cavity mould are distanced apart from each other a plurality of doses of plastics is placed between said punch and said cavity mould, so as to interact when said punch and said cavity mould are brought in said closed position.

36. Apparatus, comprising a moulding unit having a punch and a cavity mould movable along an axis between an open position in which said punch and said cavity mould are distanced apart from each other to receive a dose of plastics therebetween, and a closed position in which said punch and said cavity mould interact to form an item by pressing said dose, a supporting arrangement for supporting said dose between said punch and said cavity mould, said supporting arrangement comprising a supporting member of porous material.

37. Apparatus, comprising a moulding unit having a punch and a cavity mould movable along an axis between an open position in which said punch and said cavity mould are distanced apart from each other to receive a dose of plastics therebetween, and a closed position in which said punch and said cavity mould interact to form an item by pressing said dose, a supporting arrangement for supporting said dose between said punch and said cavity mould, said supporting arrangement comprising a tubular supporting member having holes through which air can be injected toward said dose.

38. Apparatus, comprising a moulding unit having a punch and a cavity mould movable between an open position in which said punch and said cavity mould are distanced apart from each other to receive a dose of plastics therebetween, and a closed position in which said punch and said cavity mould interact to form an item by pressing said dose, a dose-delivering mouth of an extruder being interposed between said punch and said cavity mould in said open position.

39. Apparatus according to claim 38, wherein a severing arrangement co-operates with said dose-delivering mouth so as to sever said dose from said extruder.

40. Apparatus according to claim 39, wherein said severing arrangement is mounted on said moulding unit.

41. Apparatus according to claim 39, wherein said severing arrangement is rotatable around a respective axis.

42. Apparatus according to claim 41, wherein said severing arrangement is driven by an independent motor unit.

43. Apparatus according to claim 39, wherein said severing arrangement is provided with a blade connected to a supporting member of a supporting arrangement for supporting said dose between said punch and said cavity mould.

44. Apparatus according to claim 39, wherein said severing arrangement is provided with a knife mounted on said punch or on said cavity mould.

45. Apparatus, comprising a moulding unit having a punch and a cavity mould movable between an open position in which said punch and said cavity mould are distanced apart from each other and receive a plurality of doses of plastics therebetween, and a closed position in which said punch and said cavity mould interact to form an item by pressing said plurality of doses.

46. Apparatus, comprising a pair of rods for supporting a dose of plastics between a punch and a cavity mould, said pair of rods being actuatable by a cam arrangement having a first portion for driving said rods in a dose-receiving position in which said dose is received above said rods and a second portion for driving said rods in a dose-pinching position in which said dose is pinched between said rods, said second portion being adjacent to said first portion.

47. Apparatus according to claim 46, wherein said first portion and said second portion are arranged in sequence along a direction, said punch and/or said cavity mould being movable along said direction to open or close said moulding unit.

48. Apparatus according to claim 46, wherein said cam arrangement comprises a third portion for driving said pair of rods in a dose-delivering position in which said dose is delivered between said punch and said cavity mould.

49. Apparatus according to claim 48, wherein said first portion, said second portion and said third portion are arranged in sequence along said direction.

50. Apparatus according to claim 45, comprising a supporting arrangement for supporting said plurality of doses between said punch and said cavity mould in said open position.

51. Apparatus according to claim 50, wherein said supporting arrangement comprises a pair of rods for supporting said plurality of doses.

52. Apparatus according to claim 51, wherein each of said pair of rods is provided with two adjacent curved portions for receiving said plurality of doses therebetween.

53. Apparatus according to claim 51, wherein each of said pair of rods is provided with two supporting plates protruding towards corresponding supporting plates fixed to the other rod.

54. Apparatus according to claim 50, wherein said supporting arrangement comprises a supporting member made of a porous material or with holes oriented towards said doses to inject a fluid thereagainst.

55. Apparatus according to claim 50, wherein said supporting arrangement comprises two pairs of rods which can be opened to release said doses.

* * * * *